US011572977B2

(12) United States Patent
Murphy

(10) Patent No.: US 11,572,977 B2
(45) Date of Patent: Feb. 7, 2023

(54) HINGED SUPPORT APPARATUS WITH POSITION STOPS

(71) Applicant: Johnny Rhymes with Connie, LLC, Roseville, MN (US)

(72) Inventor: John A. Murphy, Roseville, MN (US)

(73) Assignee: JOHNNY RHYMES WITH CONNIE, LLC, Roseville, MN (US)

(*) Notice: Subject to any disclaimer, the term of this patent is extended or adjusted under 35 U.S.C. 154(b) by 4 days.

(21) Appl. No.: 17/170,261

(22) Filed: Feb. 8, 2021

(65) Prior Publication Data

US 2021/0164607 A1    Jun. 3, 2021

Related U.S. Application Data

(63) Continuation-in-part of application No. 17/039,438, filed on Sep. 30, 2020.

(60) Provisional application No. 63/126,313, filed on Dec. 16, 2020, provisional application No. 62/910,668, filed on Oct. 4, 2019.

(51) Int. Cl.
*F16M 11/38*     (2006.01)
*F16M 13/02*     (2006.01)
*A45F 5/00*      (2006.01)

(52) U.S. Cl.
CPC .............. *F16M 11/38* (2013.01); *A45F 5/00* (2013.01); *F16M 13/022* (2013.01); *A45F 2200/0516* (2013.01)

(58) Field of Classification Search
CPC .............. A45F 5/022; A45F 2005/002; A45F 2200/0516; A45F 2200/0525; F16M 13/005; F16M 11/38; F16M 13/022; A45C 2200/15

USPC .......... 248/688, 188.8; 361/679.59
See application file for complete search history.

(56) References Cited

U.S. PATENT DOCUMENTS

| 1,689,787 A | 10/1928 | Kupferschmid |
| 6,266,685 B1 | 7/2001 | Danielson et al. |
| 6,360,928 B1 | 3/2002 | Russo |

(Continued)

FOREIGN PATENT DOCUMENTS

| CN | 208424450 U | 1/2019 |
| GB | 6082861 | 2/2020 |
| WO | 2017120231 A1 | 7/2017 |

OTHER PUBLICATIONS

Flygrip, Inc., Flyfrip, http://flygrip.com, accessed Aug. 27, 2012.

(Continued)

*Primary Examiner* — Ingrid M Weinhold
(74) *Attorney, Agent, or Firm* — Grumbles Law PLLC; Brittany Haanan

(57) ABSTRACT

A hinged support apparatus and method for a portable electronic display device is disclosed that includes a mounting plate and an elongated base each, respectively, having a proximal and a distal end portion. The hinged support apparatus includes a mounting plate and an elongated base, at least a portion of which is disposed upon and coplanar with the mounting plate. The mounting plate and the elongated base can include tenons that can engage in position stops located in mortises in the opposite parts. Using these tenons and mortises, the distal end of the elongated base can be locked or interlocked into a position at a splayed out angle from the mounting plate for easier viewing.

19 Claims, 20 Drawing Sheets

(56) References Cited

U.S. PATENT DOCUMENTS

| | | | |
|---|---|---|---|
| 6,397,046 B1 | 5/2002 | Kfoury | |
| 7,464,814 B2 | 12/2008 | Carnevali | |
| 7,780,047 B2 | 8/2010 | Chen et al. | |
| D633,504 S | 3/2011 | Alexander, Jr. | |
| D642,579 S | 8/2011 | Deutsch et al. | |
| 8,248,791 B2* | 8/2012 | Wang | F16M 13/005 248/188.8 |
| D673,162 S | 12/2012 | Young | |
| 8,403,288 B2* | 3/2013 | Cheng | F16M 11/10 248/673 |
| 8,428,664 B1 | 4/2013 | Wyers | |
| D689,479 S | 9/2013 | Softer | |
| 8,522,965 B1* | 9/2013 | Hsiung | A45C 11/00 206/45.24 |
| 8,820,525 B1 | 9/2014 | Zanxiang | |
| D716,287 S | 10/2014 | Ambriz | |
| 8,885,338 B1 | 11/2014 | Simpson et al. | |
| 8,897,033 B2* | 11/2014 | Slipy | H04M 1/0202 361/679.01 |
| D721,373 S | 1/2015 | Logereau | |
| 8,939,483 B2 | 1/2015 | Kim | |
| 8,950,638 B2 | 2/2015 | Wangercyn, Jr. et al. | |
| 8,960,630 B2* | 2/2015 | Fu | H04M 1/04 248/560 |
| 8,973,795 B2 | 3/2015 | Chiu, Jr. et al. | |
| 9,027,808 B2 | 5/2015 | Kim | |
| D735,695 S | 8/2015 | Murphy | |
| 9,204,710 B1 | 12/2015 | Burns et al. | |
| 9,259,077 B2 | 2/2016 | Murphy et al. | |
| 9,266,641 B2* | 2/2016 | Quehl | A45C 11/00 |
| 9,316,344 B2* | 4/2016 | Le Gette | F16M 13/02 |
| D763,857 S * | 8/2016 | Dang | D14/440 |
| 9,512,655 B2* | 12/2016 | Kuo | E05D 1/04 |
| 9,565,909 B2* | 2/2017 | Song | G06F 1/166 |
| 9,671,064 B2* | 6/2017 | Tussy | F16M 11/10 |
| 9,723,735 B1* | 8/2017 | Kim | F16M 11/041 |
| 9,917,937 B1* | 3/2018 | Fathollahi | H04B 1/3888 |
| 9,954,569 B2 | 4/2018 | Murphy et al. | |
| 10,139,866 B2* | 11/2018 | Chen | G06F 1/166 |
| D855,606 S * | 8/2019 | Kim | D14/250 |
| D857,005 S * | 8/2019 | Yu | D14/253 |
| 10,694,837 B1* | 6/2020 | Altschul | H04M 1/04 |
| 10,856,633 B2* | 12/2020 | Stagge | H04B 1/3888 |
| 10,935,182 B2* | 3/2021 | Lin | H05K 5/0234 |
| D932,482 S * | 10/2021 | Del Toro | D14/253 |
| 2003/0066856 A1 | 4/2003 | Lehtonen | |
| 2004/0013279 A1 | 1/2004 | Takeda | |
| 2005/0205623 A1 | 9/2005 | Buntain | |
| 2006/0054704 A1 | 3/2006 | Fitch et al. | |
| 2008/0083797 A1 | 4/2008 | Myers | |
| 2008/0203127 A1 | 8/2008 | Castillo-Garrison | |
| 2009/0090750 A1 | 4/2009 | Alcenat | |
| 2009/0321483 A1 | 12/2009 | Froloff | |
| 2010/0090085 A1 | 4/2010 | Corrion | |
| 2010/0116387 A1 | 5/2010 | Channey et al. | |
| 2010/0171021 A1 | 7/2010 | Smith | |
| 2010/0171671 A1* | 7/2010 | Park | F16M 13/00 248/688 |
| 2010/0222118 A1 | 9/2010 | Interdanato | |
| 2010/0264182 A1 | 10/2010 | Perlman et al. | |
| 2011/0034221 A1 | 2/2011 | Hung et al. | |
| 2011/0036965 A1 | 2/2011 | Zhang et al. | |
| 2012/0063066 A1 | 3/2012 | Floit | |
| 2012/0074291 A1* | 3/2012 | Fu | F16M 11/10 248/560 |
| 2012/0106054 A1* | 5/2012 | Royz | F16M 11/10 248/688 |
| 2012/0267402 A1* | 10/2012 | Beatty | A45F 3/14 224/218 |
| 2012/0299318 A1 | 11/2012 | Murphy et al. | |
| 2012/0319414 A1 | 12/2012 | Potter et al. | |
| 2013/0009413 A1 | 1/2013 | Chiu, Jr. et al. | |
| 2014/0054910 A1 | 2/2014 | Kim | |
| 2014/0062885 A1 | 3/2014 | Parker | |
| 2014/0151249 A1 | 6/2014 | Grimm et al. | |
| 2014/0151417 A1 | 6/2014 | Gayler | |
| 2014/0152034 A1 | 6/2014 | Tussy | |
| 2014/0159403 A1 | 6/2014 | Kim | |
| 2014/0202886 A1 | 7/2014 | Kim | |
| 2014/0217135 A1 | 8/2014 | Murphy et al. | |
| 2014/0231276 A1 | 8/2014 | Jung | |
| 2015/0092346 A1 | 4/2015 | Ben et al. | |
| 2015/0108313 A1* | 4/2015 | Leung | H04M 1/04 248/351 |
| 2015/0122850 A1* | 5/2015 | Quehl | A45C 11/00 224/191 |
| 2015/0365125 A1 | 12/2015 | Murphy et al. | |
| 2015/0374118 A1 | 12/2015 | Hooft et al. | |
| 2016/0134733 A1 | 5/2016 | Murphy et al. | |
| 2016/0286016 A1* | 9/2016 | Lee | H04M 1/04 |
| 2016/0286944 A1 | 10/2016 | Snyder | |
| 2016/0345695 A1* | 12/2016 | Stagge | A45F 5/00 |
| 2017/0223161 A1* | 8/2017 | Lau | F16M 11/10 |
| 2018/0210494 A1* | 7/2018 | Chen | G06F 1/1626 |
| 2019/0245572 A1 | 8/2019 | Otmani et al. | |
| 2020/0214408 A1* | 7/2020 | Shin | A45C 11/00 |
| 2021/0059370 A1* | 3/2021 | Del Toro | H04M 1/04 |

OTHER PUBLICATIONS

Scott Paul Technologies, CellHandle, http://www.scottpaultech.com/index/html, accessed Aug. 27, 2012.

Kemelope Enterprises, LLC, Lazy-Hands, Thumbs-Free Grips for Mobile Devices, http://www.lazy-hands.com, accessed Aug. 27, 2012.

Non-Final Office Action for U.S. Appl. No. 13/481,581; dated Jan. 24, 2013; date of filing: May 25, 2012; 6 pp.

Non-Final Office Action for U.S. Appl. No. 14/251,146; dated Sep. 25, 2014; date of filing: Apr. 11, 2014; 5 pp.

Final Office Action for U.S. Appl. No. 14/251,146; dated Mar. 26, 2015; date of filing: Apr. 11, 2014; 7 pp.

International Search Report and Written Opinion for International Application No. PCT/US2020053702, dated Dec. 7, 2020; date of filing: Oct. 1, 2020; 11 pp.

International Preliminary Report on Patentability for International Patent Application No. PCT/US2017/012183, dated Mar. 17, 2017; date of filing: Jan. 4, 2017; 14 pp.

International Search Report and Written Opinion pertaining to PCT/US2021/063588, dated Mar. 1, 2022.

* cited by examiner

HINGED SUPPORT APPARATUS WITH POSITION STOPS

RELATED APPLICATIONS

This application claims the benefit of U.S. Provisional Patent Application Ser. No. 63/126,313, filed Dec. 16, 2020, and entitled, "HINGED SUPPORT APPARATUS WITH POSITION STOPS". This application is also a continuation-in-part of U.S. patent application Ser. No. 17/039,438, now pending, filed Sep. 20, 2020 and entitled, "HINGED SUPPORT APPARATUS" which claims the benefit of U.S. Provisional Patent Application Ser. No. 62/910,668, filed Oct. 4, 2019, now expired and entitled "HINGED SUPPORT APPARATUS", which is herein incorporated by reference in its entirety.

FIELD

This disclosure relates to hinged supports for small, portable electronic display devices that can withstand repeated flexing without breaking and are useful for holding the electronic displays at viewable angles.

BACKGROUND

Portable electronic display devices such as, for example, cell phones, tablets, and other small electronic displays having a visible display, are almost universally used in today's world. Most of these devices have a planar viewing display and may be hard to view—especially by a user sitting at a desk, in a chair, or viewing the display at an angle for one reason or another.

Stands are available for such devices into which the electronic display can be attached or inserted. Then the stands can be set upright on a surface such as a desk or table and can allow the display face of the electronic display to be viewed at an angle that is easily seen by a user. These stands can be freestanding and can sometimes have collapsible legs or stands to hold them upright.

SUMMARY

The currently available stands for portable electronic display devices are somewhat bulky and typically larger than the electronic display itself enabling the electronic display to be inserted into the stand for upright use. What would be useful would be a small, portable apparatus that could directly attach to a small portable electronic display, such as a cell phone, that would allow it to be held at a viewable angle for users. Furthermore, it would be useful to have such an apparatus that could lock into such viewable positions.

In one aspect, a hinged support apparatus for a portable electronic display is disclosed that can include a mounting plate having a proximal end and a distal end and an elongated base having a proximal end and a distal end. The proximal end of the elongated base can be attached to the proximal end portion of the mounting plate. The apparatus also can include a first tenon disposed upon the proximal end of the mounting plate and a first mortise disposed upon the proximal end of the elongated base with the first tenon is engaged with the second mortise. The first mortise can include at least one position stop. The disclosed apparatus can also further include a second tenon disposed upon the proximal end of the elongated base and a second mortise disposed upon the proximal end of the mounting plate. The second mortise can include at least one position stop.

The disclosed hinged support apparatus can also include an elastic band having a first end and a second end wherein the first end of the elastic band is attached to the proximal end of the base and the second end of the elastic band is attached to the distal end of the base. In some embodiments, the disclosed hinged support apparatus can be attached to at least one side of the electronic display device with a strong adhesive.

In some embodiments, the elongated base can include at least one living hinge. In some embodiments the elongated base can include at least two living hinges. The mounting plate or the elongated base can include a magnet. In some embodiments, at least a portion of the elongated base may not be substantially coplanar and elongated base forms an easel with the mounting plate.

In another aspect, a method of using a hinged support apparatus for a portable electronic display is disclosed that includes providing an apparatus for a portable electronic display device. The portable electronic display device can include a mounting plate having a proximal end and a distal end and an elongated base having a proximal end and a distal end, wherein the proximal end of the elongated base is attached to the proximal end portion of the mounting plate. A first tenon can be disposed upon the proximal end of the mounting plate and a second mortise can be disposed upon the proximal end of the elongated base. A kickstand (or easel formation) can be made by bending the elongated base at one living hinge on the elongated base so that the distal end of the elongated base is splayed away from the mounting plate at an angle. The disclosed method can also include locking the distal end of the elongated base in position by engaging the first tenon into position stops built into the second mortise.

In this application, the terms:

"aligned" refers to two elongated parts being substantially oriented along the same axis;

"living hinge" refers to a thin hinge made from the same material as the two rigid pieces it connects. It is typically thinned or cut to allow the rigid pieces to bend along the line of the hinge;

"locked" refers to a position of embodiments of the hinged support apparatus in which the distal end of the elongated base is held at a predetermined angle by engagement of one tenon with one mortise;

"interlocked" refers a position of embodiments of the hinged support apparatus in which the distal end of the elongated base is held at a predetermined angle by engagement of two tenons with engaged with two mortises;

"mortise" refers to a recess cut into a part that allows another part to fit completely within the recess;

"mounting plate" refers to a part of the disclosed apparatus that is anchored to a portable electronic display device and forms the foundation of the disclosed hinged support apparatus;

"strong adhesive" refers to an adhesive that can hold substantial weight tightly and, in some embodiments can be a curable adhesive or an adhesive designed for structural use; and "substantially coplanar" refers to two planar objects that are oriented in parallel planes or are oriented in very close to parallel planes. In this application, they are oriented within five degrees of each other.

The disclosed hinged support apparatus described herein provides a small, portable apparatus that is easily applied by a user of a portable display device. This apparatus can be used as a stand for the portable display device to allow the display device to be held at a comfortable viewing angle by the user. The apparatus is easily applied by the user, collapses to a substantially planar configuration or can be converted to an easel configuration in which the apparatus acts as an "easel-like" stand for the display device.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in support with the accompanying drawings, in which.

DETAILED DESCRIPTION

Figure 1:
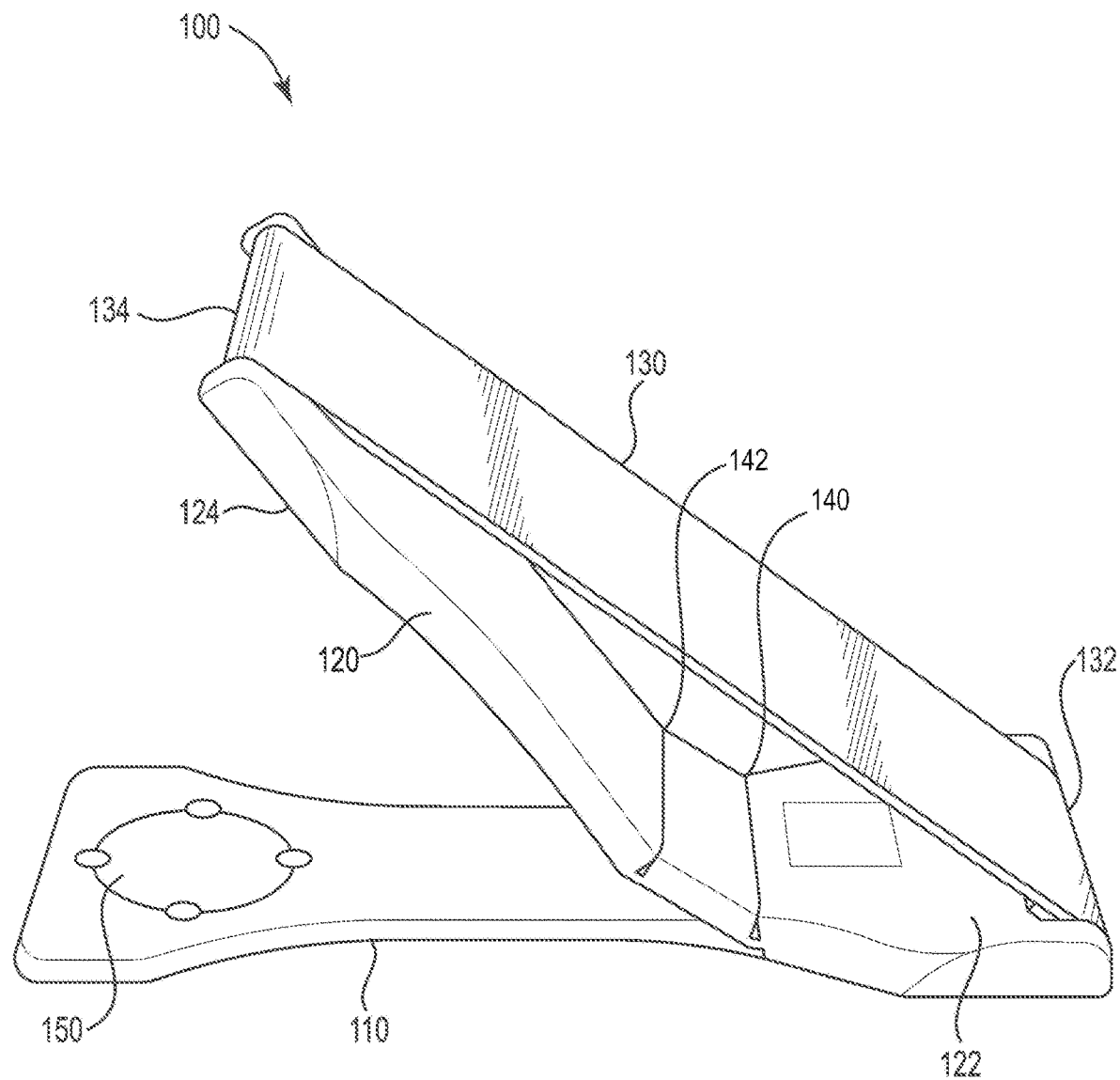
FIG. 1 is a perspective view of an embodiment of a disclosed hinged support apparatus in an easel configuration.

In the following description, reference is made to the accompanying set of drawings that form a part of the description hereof and in which are shown by way of illustration several specific embodiments. It is to be understood that other embodiments are contemplated and may be made without departing from the scope or sprit of the present disclosure. The following detailed description, therefore, is not to be taken in a limiting sense. Unless otherwise indicated, all members expressing sizes, amounts, and physical properties used in the specification and claims are to be understood as being modified in all instances by the term "about." Accordingly, unless indicated to the contrary, the numerical parameters set forth in the foregoing application and attached claims are approximations that can vary depending upon the desired properties sought to be obtained by those skilled in the art utilizing the teachings disclosed herein. The use of numerical ranges by endpoints includes all members within that range (e.g., 1 to 5 includes 1, 1.5, 2, 2.75, 3, 3.80, 4, and 5) and any range within that range.

The present disclosure relates to a hinged support apparatus useful for portable electronic displays such as, but not limited to, cell phones, smart tablets, portable radios, small computers, controllers, and other handheld electronic displays. The disclosed hinged support apparatus can exist in a number of different configurations. In one configuration, the disclosed support apparatus can be collapsed so that all of its components (mounting plate, elongated base, and elastic band) can be substantially coplanar. In another configuration (herein referred to as an "easel configuration"), the proximal end of the elongated base can be essentially coplanar with the mounting plate (usually adhered to an electronic display device), but the elongated base can be bent at one or two or more living hinges to splay out at an angle from the mounting plate (easel configuration) to form a supporting leg for the mounting plate and, if present, the portable electronic display device. In these easel configurations, the mounting plate can hold the portable electronic display device at an easily viewable angle of the user's choosing.

The disclosed hinged support apparatus can be used to form the back of an easel structure when the support is attached to the back of the electronic displays. In these configurations, which are described herein, the hinged support apparatus can self-support the electronic display and can hold it at a viewing angle desired by the user. It is contemplated that there are an infinite number of easel configurations depending upon the angle between the distal end of the elongated base and the proximal end of the elongated base. However, to be useful, an easel configuration needs to hold the mounting plate (and attached portable electronic display device) at a comfortable viewing angle for the viewer and in a stable geometric configuration so that the easel does not fall or collapse.

The disclosed hinged support apparatus can include a mounting plate having a first end and a second end. The mounting plate can be made of any rigid material and may include at least one opening through it. The mounting plate typically can be made of metal, ceramic, polymer, composite, or any rigid structural material. In some embodiments, the mounting plate can include an opening or mortise into which a strike plate can be inserted. The strike plate can be any material that can be attracted to a magnet. At least one surface of the mounting plate should be capable of adhering to a strong adhesive that can hold it tightly to the back of a portable electronic display. In some embodiments, the adhesive can be a curable adhesive such as an epoxy, melamine, polyurethane, cyanoacrylic, or other type of curable adhesive that results in a strong bond. In other embodiments the adhesive can be pressure-sensitive but have good holding power. Examples of strong pressure-sensitive adhesives include VHB tape, available from 3M, St. Paul, Minn.

The disclosed hinged support apparatus also can include an elongated base. The elongated base has a proximal end and a distal end. The proximal end of the elongated base can be attached to the first end or proximal end of the mounting plate. The elongated base can have one dimension that is substantially longer than the other dimension—in some embodiments the long dimension can be at least twice the length of the short diameter. In some embodiments the long dimension can be even longer than twice the length of the short diameter. When the disclosed hinged support is collapsed and the base can become substantially coplanar with the mounting plate, the elongated base can be substantially aligned and substantially overlaps with a substantial portion of the mounting plate.

The elongated base can be rigid enough to hold the weight of the electronic display when it is in an easel configuration but is capable of forming a living hinge. Typically, the elongated base can be made of high-density rubber, polypropylene, polyurethane, TEPG (polyethylene terephthalate glycol), TPU (thermoplastic polyurethane), or other rigid but not overly brittle plastics. The elongated base can include at least one living hinge across its short that extends approximately perpendicular to the long dimension of the base. The at least one living hinge can be located between the first, proximal, end and the second, distal, end of the elongated base allowing the elongated base to form the back side of an easel support for the electronic display. In some embodiments, the elongated base can include two or more living hinges. In most embodiments, the proximal end of the elongated base can be coplanar with the mounting plate and substantially coplanar with portable electronic display device.

The flat part of the elongated base between the proximal end of the base and the closest living hinge to the proximal end of the base, if there is more than one living hinge, can be attached to the first end of the mounting plate. Typically, the proximal end of the elongated base can include a magnet embedded within or inserted into a mortise of the elongated base. The magnet can hold the distal, flat, proximal, part of the elongated base flush to the back of the portable electronic display by being attracted to the strike plate embedded in the mounting plate. Similar to the proximal end of the elongated base, which can have a recess that permanently houses the mounting plate, the distal end of the elongated base can have a recess within it to accommodate the mounting plate when the easel form of the hinged support is collapsed and substantially coplanar. More specifically, the distal end of the elongated base can be flush or coplanar with the mounting plate when collapsed or can be splayed away from the mounting plate at an angle and form, in some embodiments, a support for the easel configuration of the disclosed hinged support. The one or more living hinges in the elongated base can allow for the distal end of the elongated base be self-standing and to form an acute angle with the mounting plate thereby holding the portable electronic display device at an angle of a viewer's choosing.

The disclosed hinged support can have an elastic band having a first end and a second end attached to the proximal end of the base and the end of the base distal from the side facing the mounting plate. The elastic band can be made of any stretchable or elastic material such as the material used in medical elastic wrap, material used in clothing, stretchable cloth, or any other material that can be stretched and is capable of returning its original dimensions. In particular, materials used in waistbands, for wristbands, SPANDEX, or for jewelry can work in this disclosure.

The elastic band can attach to both the distal end and the proximal end of the elongated base. In this configuration, the elastic band can act as a spring to hold the disclosed apparatus in an easel configuration. In the collapsed configuration the elastic band can be in a stretched mode. In this configuration, the magnet can hold the distal of the elongated base substantially coplanar with the strike plate (and the portable electronic display device). When the disclosed apparatus is moved to an easel configuration, the relaxation of the stretched elastic band can pull the distal of the elongated base away from the plane of the mounting plate forming a triangular base for upright positioning of the portable electronic display device.

Another feature of the elastic band can be to be used as a handle for the hinged support apparatus in a collapsed state to move it to an easel configuration. This can be done, for example, by inserting one or more fingers under the elastic band and pulling it in an outward direction. Similarly, the elastic band can be used to create a secure grip for users. For example, by inserting one or more fingers under the elastic band with the palm facing the portable electronic display device, a user can ensure the portable electronic display device will stay in his or her hands during use.

Some uses of the disclosed apparatus, particularly when it is attached to a portable electronic display device can be to form a clip to hold the portable electronic display device. For example, the disclosed apparatus can clip such a display device to an article of clothing, such as a pocket of a shirt, jacket, or pair of pants. In another embodiment, the disclosed apparatus can hold, for example, earphones when they are wrapped around the clip.

An improved hinged support apparatus for portable electronic devices is presented herein. This improved support apparatus includes a "kickstand" (distal end of elongated base) that can include at least one interlock attached to a mounting plate. The "kickstand" The at least one interlock can allow the kickstand to be stably locked in multiple predetermined positions for viewing or using an electronic device at various angles and orientations with respect to the position of the mounting plate.

The at least one interlock includes one or more tenons that fit into one or more position stops. In some embodiments, the improved hinged mounting apparatus has a first and a second living hinge, a first tenon disposed upon the proximal end of the mounting plate and a first mortise disposed upon the proximal end of the elongated base. In some embodiments, the hinged mounting apparatus can further include a second tenon disposed upon the proximal end of the mounting plate and a second mortise disposed upon the proximal end of the elongated base. The first mortise disposed upon the proximal end of the elongated base can have position stops that can provide a lock for the first tenon located on the proximal end of the mounting plate. The first mortise can have stops that can provide a lock for the first tenon located at the proximal end of the mounting plate.

In some other embodiments, the disclosed hinged support apparatus can include a second tenon disposed upon the proximal end of the elongated base and a second mortise disposed upon the proximal end of the mounting plate. The second mortise can include position stops. The second tenon can be engaged in one of the position stops in the second mortise. It is contemplated that the elongated base can be locked into a desired easel configuration by either the engagement of the first tenon with the first mortise or the engagement of the second tenon with the second mortise. However, the distal end of the elongated base can be interlocked with the mounting plate if both the first tenon engaged with the first mortise and the second tenon is engaged with the second mortise. This is illustrated in more detail in the figures.

The top plate (elongated base) of the apparatus can be effectively divided in to three rigid sections by the two hinges. In some embodiments, the elongated base of the apparatus can be disposed upon and coplanar with the mounting plate. The mounting plate can be attached to the back plate of an electronic device such as a smart phone or smart tablet. The proximal end of the elongated base can remain coplanar with the mounting plate. The central section, which can be relatively short and can provide flexibility at the first hinge to an angle roughly 45 degrees from the plane of the first section. The third section forms the 'kickstand' and is attached via the second hinge and can form an angle of up to roughly 90 degrees, if desired, from the first section. The third section has a tenon (first tenon) that protrudes through the second hinge towards the first hinge. The first tenon has a smaller mortise (first mortise) or pocket facing the mounting plate.

The mounting plate of the apparatus can have a mortise or pocket (second mortise) with position stops. As the kickstand is lifted from its co-planar position, first tenon can slide along the top of the bottom plate until it falls on a position stop in the first mortise, locking the kickstand in position. The further the kickstand is lifted, the further down the steps of the first tenon can travel. As the first tenon is moved in to the first mortise, the second tenon can fit in to the second mortise, interlocking the kickstand by stopping the kickstand from being over-extended, stressing the hinges, or being pulled away from the electronic device.

Additionally, in some embodiments there is pocket in bottom of the bottom plate for the insertion of a radio frequency device.

In another aspect, a method of using a hinged support apparatus for a portable electronic display device is disclosed that can include an apparatus for a portable electronic display such as that described above. The disclosed method can include providing a hinged support apparatus (described herein). The provided apparatus can include an elongated base disposed upon a mounting plate wherein initially the elongated base is coplanar to and aligned with the mounting plate. The elongated base and the mounting plate each have a proximal end and a distal end. The proximal end of the elongated base always remains coplanar and aligned with the proximal end of the mounting plate. In some embodiments, the distal end of the elongated base can be splayed away from the plane of the mounting plate and held there with tenons and mortises as herein described.

The disclosed method can include bending at least a portion of the distal end of the elongated base at one living hinge so that it splays away from the plane of the mounting plate— forming an easel configuration or other open configuration. In some embodiments, the distal end of the elongated base can be further splayed away from the plane of the mounting plate by bending the elongated base at a second, or additional living hinge.

In some embodiments, the disclosed method can include locking a first tenon disposed upon the proximal end of the elongated base into a first mortise disposed upon the proximal end of the mounting plate. The first mortise disposed upon the proximal end of the mounting plate can include one or more position stops. The first tenon of the elongated base can engage in one of the position stops of the first mortise on the mounting plate to hold the elongated base at a predetermined angle from the mounting plate when splayed open and engaged. In some embodiments, the angle can be about 45 degrees. In other embodiments, the angle can be ortho or about 90 degrees. Any other angles can be locked into the splayed-out elongated base depending upon the location of the position stops in the first mortise.

In some embodiments, the disclosed method includes engaging a second tenon located on the proximal end of the elongated base with a second mortise located on the proximal end of the mounting plate. This engagement of the second tenon with the second mortise (that also includes position stops) can be used alone to lock the distal portion of the elongated base at an angle splayed away from the plane of the mounting plate. Or, in some embodiments, the first tenon can be engaged into one of the position stops in the first mortise and the second tenon can be engaged into one of the position stops in the second mortise thereby interlocking the kickstand configuration.

The method can also include pulling the elastic band to separate the magnet embedded in the elongated base from the portable electronic display device to form a self-standing easel comprising the portable electronic display. The method further can include attaching the hinged support apparatus to the mounting plate using a strong adhesive.

The disclosed device may be further understood by referring to the accompanying figures. FIG. 1 is a perspective view of an embodiment of a disclosed hinged support apparatus in an easel configuration. Apparatus 100 includes mounting plate 110. In some embodiments, mounting plate 110 can be attached to one side of a portable electronic display device. Typically, mounting plate 110 can be attached to the back side or back case of the portable electronic display device. Disposed upon and anchored to mounting plate 110 is proximal end 122 of elongated base 120. Mounting plate 110 can be anchored by any number of attachment methods such as the use of adhesives, welds, ultrasonic welds, screws, bolts, or other attachment methods known in the art. Proximal end 122 of elongated base 120 is substantially coplanar with mounting plate 110 and surrounds mounting plate 110 so that the edges of proximal end 122 are substantially flush with mounting plate 110. Distal end 124 of the elongated base 120 can be splayed at an angle to proximal end 122 of elongated base 120. In the embodiment illustrated in FIG. 1, first living hinge 140 and second living hinge 142 bend the intermediate portion of the elongated base that results in distal end 124 residing at an angle with respect to proximal end 122 of elongated base 120. The apparatus illustrated in FIG. 1 is in an easel configuration and can be self-standing. Elastic band 130 has first end 132 that attaches to proximal end 122 of elongated base 120 and second end 134 that attaches to distal end 124 of the elongated base. Mounting plate 110 includes mounting plate opening 150. The attachments are shown in more detail in FIG. 3C.

Figure 2A:
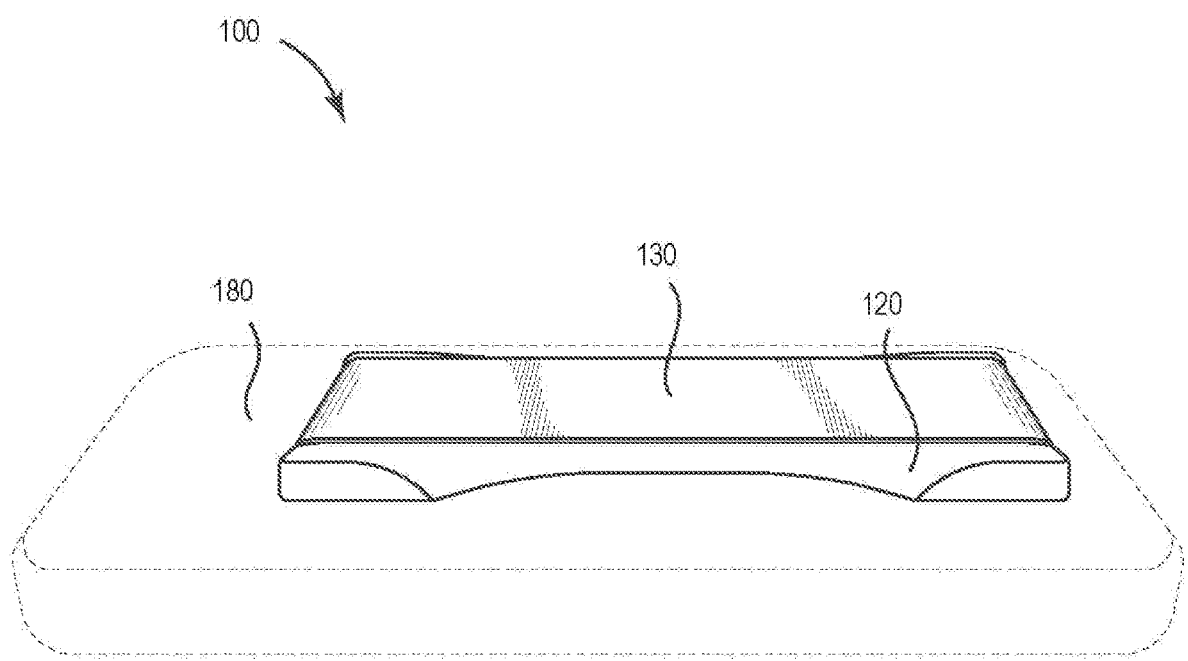
FIG. 2A is a perspective view of an embodiment of a disclosed hinged support apparatus in a collapsed configuration.
Figure 2B:
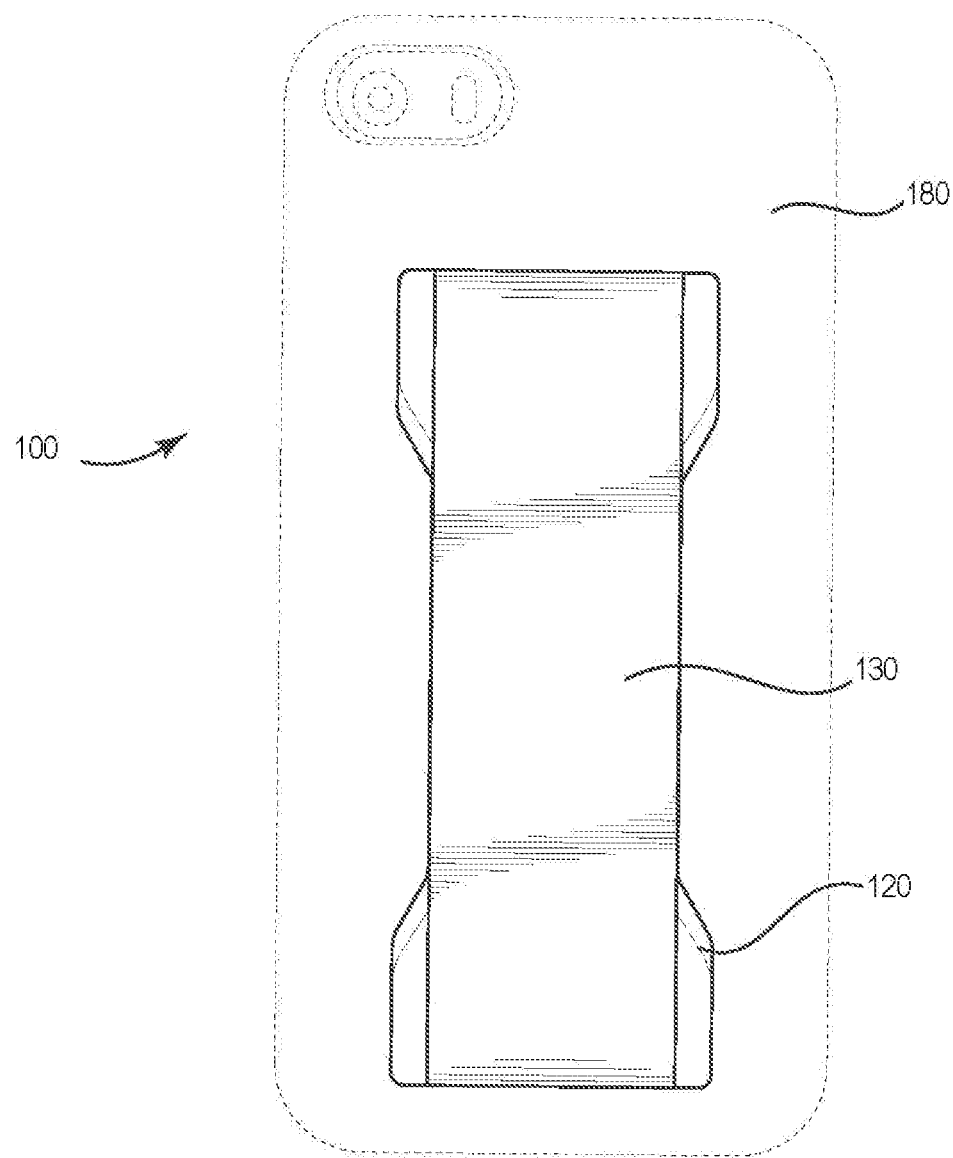
FIG. 2B is a top-down planar view of the embodiment of the disclosed hinged support apparatus shown in FIG. 2A.
Figure 2C:
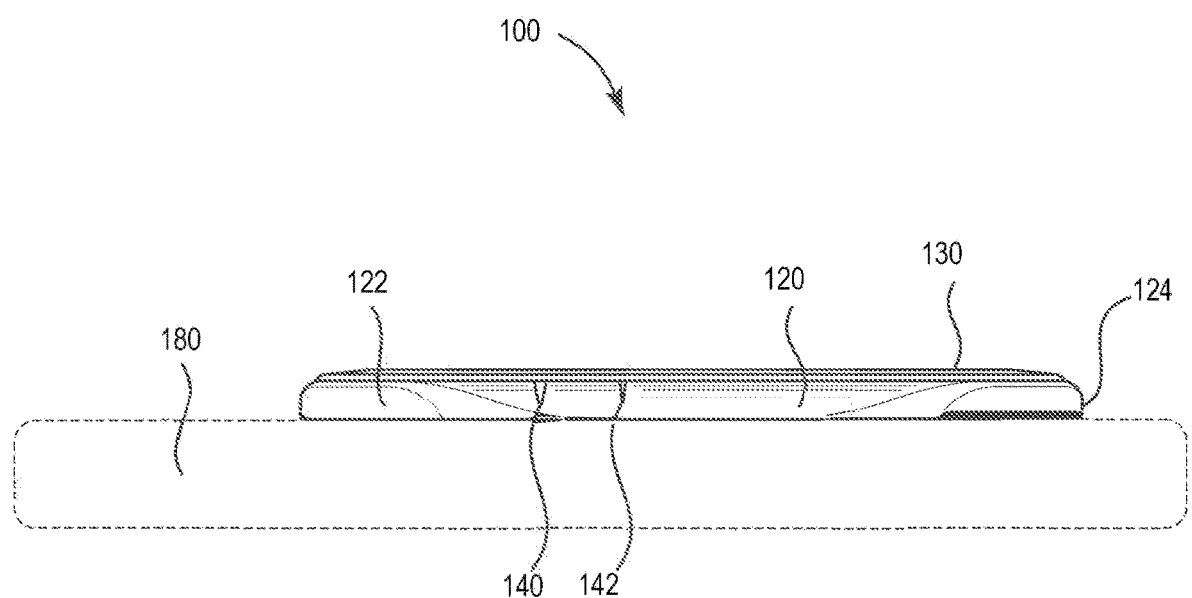
FIG. 2C is a side view of the embodiment of the disclosed hinged support apparatus shown in FIG. 2A.

FIGS. 2A-C are perspective, top down planar, and side views, respectively, of an embodiment of a disclosed hinged support apparatus in a collapsed configuration. All reference numbers on FIGS. 2A-C refer to the same elements which are described herein. Hinged support apparatus 100 illustrated by the view shown in FIGS. 2A-C show apparatus 100 disposed upon the back of portable electronic display device 180 (not part of apparatus 100 and, in the embodiment shown in the Figures is a cell phone). The illustrations, collectively, show elongated base 120 disposed upon the backside of portable electronic device 180. Elongated base 120 covers over a mounting plate that is not visible in any of the Figures since elongated base 120 completely covers the mounting plate. In the side view, FIG. 2C, elongated base 120 includes first living hinge 140 and second living hinge 142 located between first, proximal end 122 and second, distal end 124 of elongated base 120 respectively. Although not shown in any of FIGS. 2A-C first, proximal end 122 of elongated base 120 is substantially coplanar with portable electronic display device 180 and remains so whether apparatus 100 is in its collapsed state (as shown in FIGS. 2A-C) or in an easel configuration as shown in accompanying figures.

Figure 3A:
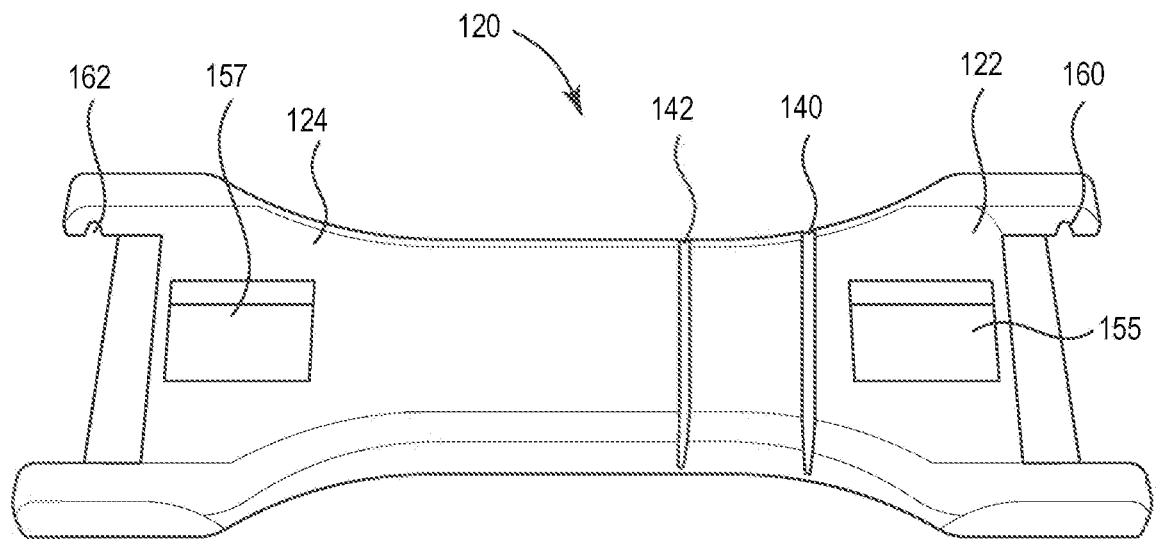
FIG. 3A is a top-down perspective view of the elongated base of the hinged support apparatus illustrated in FIG. 1A.
Figure 3B:
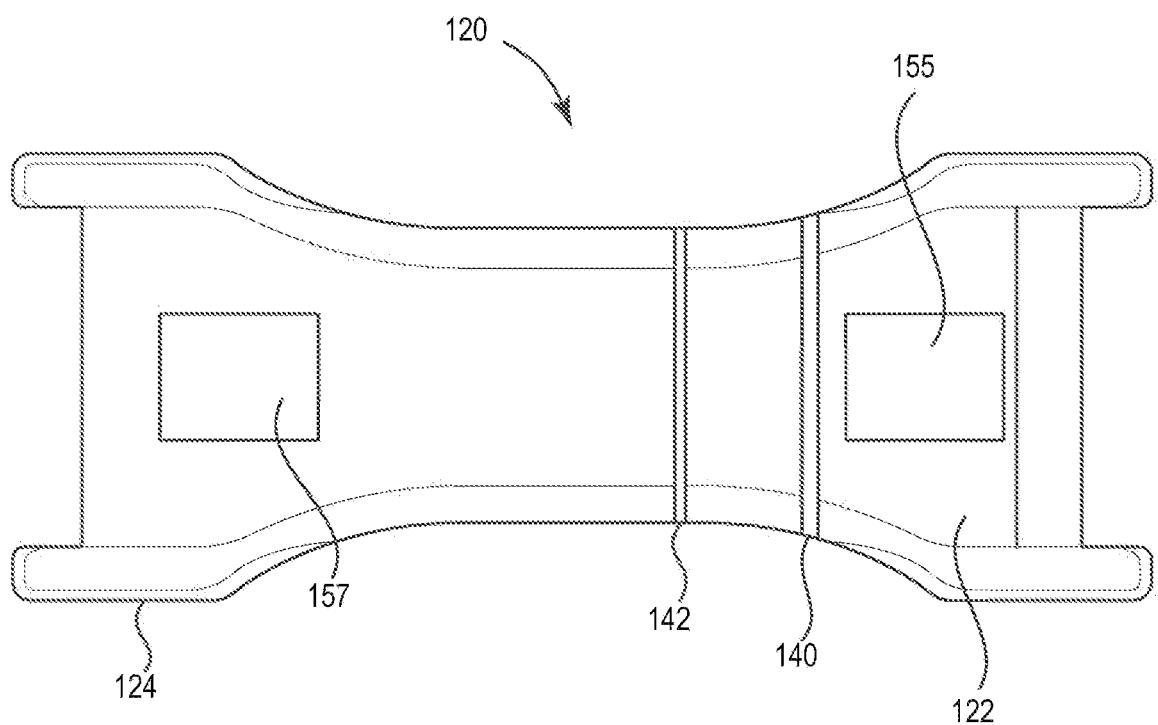
FIG. 3B is a top-down planar view of the elongated base illustrated in FIG. 3A.

FIGS. 3A and 3B are top-down perspective and top-down planar views, respectively, of elongated base 120 of the hinged support apparatus illustrated in FIG. 1. Both FIGS. 3A and 3B illustrate proximal portion 122 of elongated base 120 and distal portion 124 of elongated base 120. In the illustrated embodiment, proximal portion 122 and distal portion 124 of elongated base 120 are separated by first living hinge 140 and second living hinge 142. Elastic band 130 attaches to and spans the distance between proximal end 122 of elongated base 120 and distal end 124 of elongate base 120. Also illustrated in this embodiment are two mortises or recesses 155 and 157, one mortise 155 embedded in proximal portion 122 and one mortise 157 embedded in distal portion 124 of elongated base 120. Magnets (not shown in the illustrations) can be fit into mortises—first mortise 155 and second mortise 157. The magnets can be placed in the mortises so that they are within the mortises and do not project above the plane of the top (shown) substantially flat surface of elongated base 120. Also shown in FIG. 3A are notches 160 and 162 located at the tips of proximal and distal portions 122 and 124 of elongated base 120, respectively. These notches are useful for aiding in attachment of an elastic band 130 to elongated base 120. One embodiment of attachment of the elastic band to the elongated base is shown in FIG. 3C.

Figure 3C:
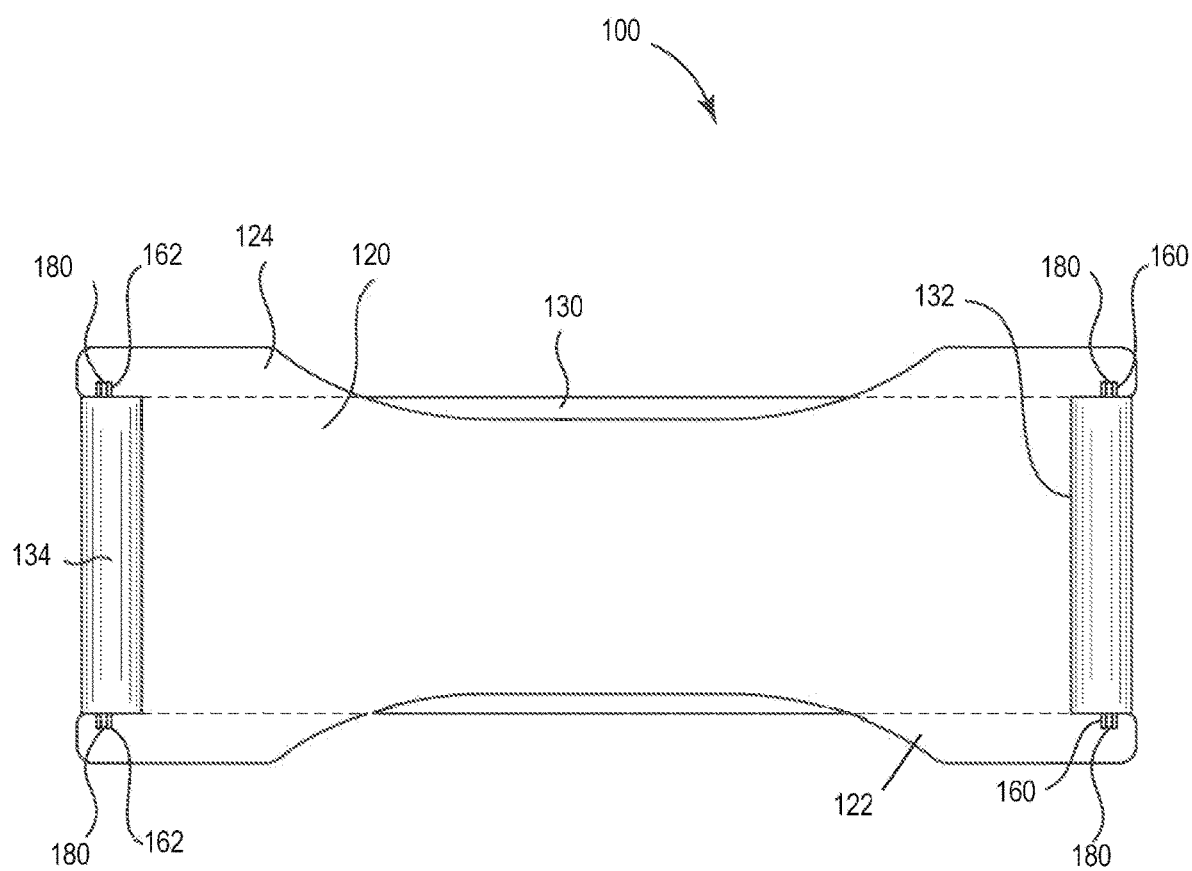
FIG. 3C is a bottom-up planar view of the elongated base illustrated in FIG. 3A.

FIG. 3C is a bottom-up planar view of the elongated base portion illustrated in FIG. 3A. Elongated base 120 has elastic band 130 disposed upon its opposite side than that shown in the illustration. A portion of elastic band 130 is shown where not hidden by elongated base 120 due to the shape of elongated base 120 having a smaller diameter near its center compared to near proximal and distal portions 122 and 124. Also illustrated are the two ends 132 and 134 of elastic band 130 that are wrapped around spindles 180 as shown at each end of elongated base 120. In one embodiment, such as that illustrated in FIG. 3C, two spindles both labeled 180 can be, for example, a watch band pin. Spindles 180 can fit into proximal notches 160 and distal notches 162 (and also shown in FIG. 3A) to hold elastic band. In some embodiments, the ends 132 and 134 are folded into a loop and secured so that spindles 180 can fit inside of the loop.

Figure 4A:
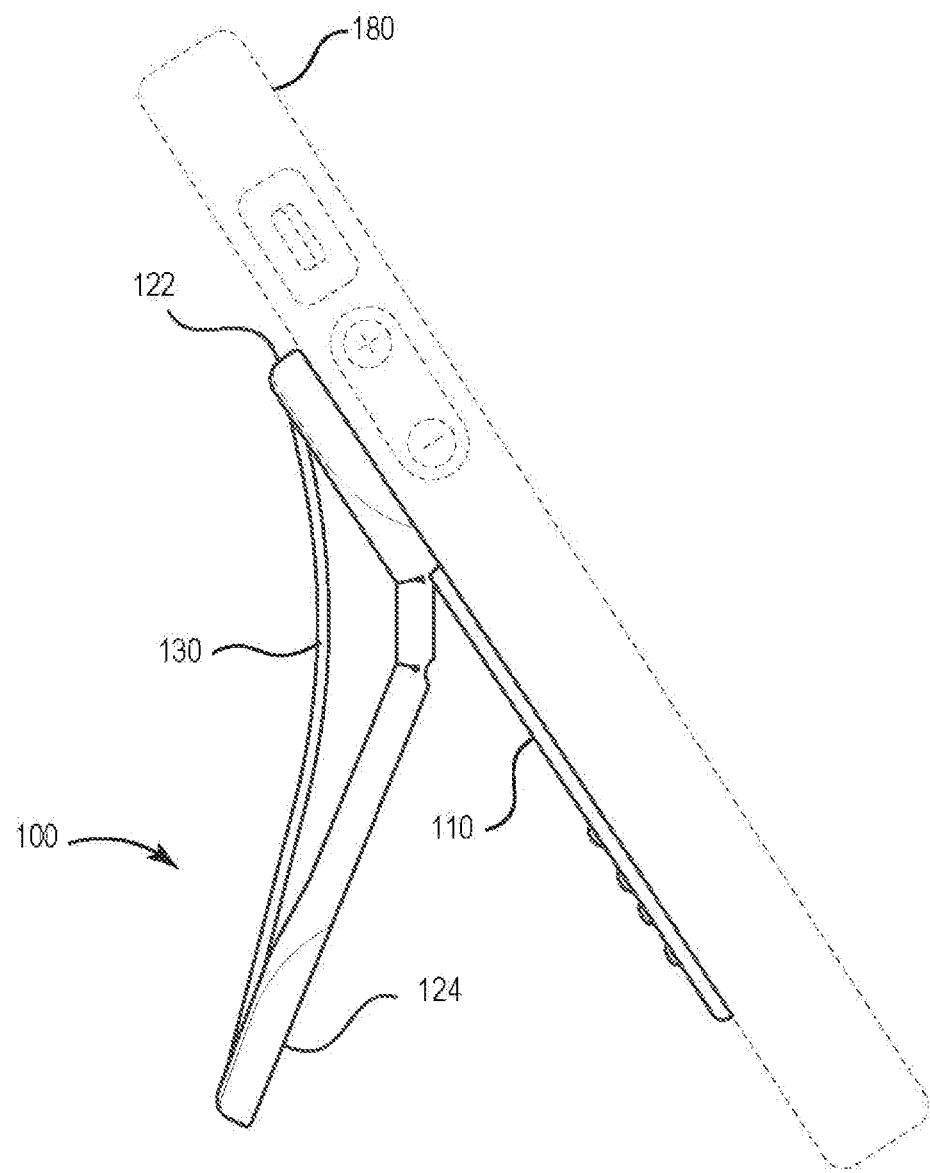
FIG. 4A is a side view of an embodiment of the disclosed article illustrated in FIG. 1A that includes an attached portable electronic display device and is in an easel configuration.
Figure 4B:
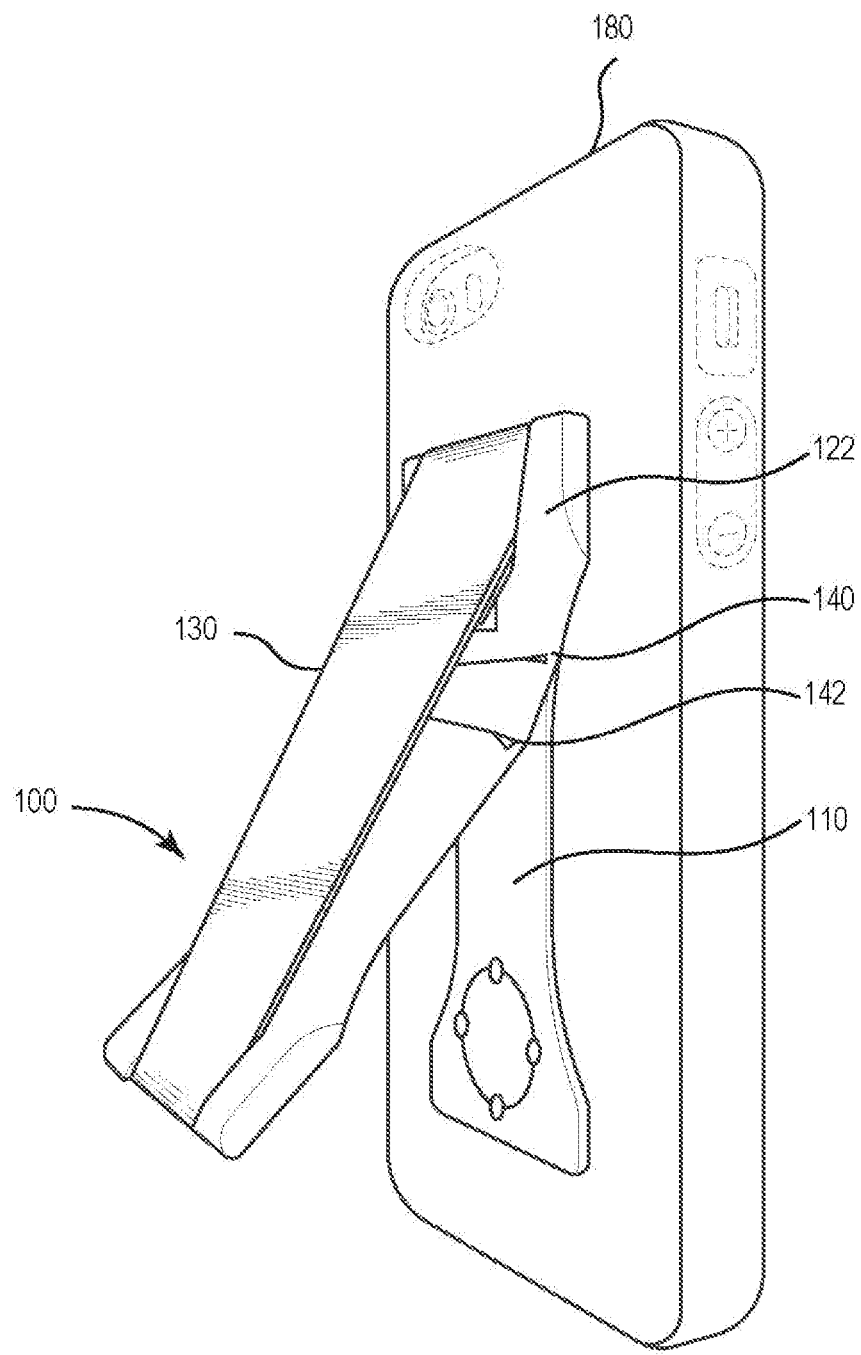
FIG. 4B is a perspective view of an embodiment of the disclosed article illustrated in FIG. 1A that includes an attached portable electronic display device and is in an easel configuration.

FIGS. 4A and 4B are a side view and a back-perspective view, respectively of an embodiment of the disclosed article illustrated in FIG. 1 that includes an attached portable electronic display device and is in an easel configuration. The embodiment illustrated in FIGS. 4A and 4B show hinged support apparatus 100 attached to the back side of portable electronic device 180. Mounting plate 110 is disposed upon and coplanar with the back side of the portable electronic device. Proximal end 122 of elongated base 120 is attached to mounting plate 110 at the first end portion of the mounting plate and is also coplanar with the backside of the portable electronic device. Distal end 124 of elongated base 120 is splayed out away from the plane of mounting plate 110 by an angle of approximately 45 degrees and is held there by tension from elastic band 130. Second, distal end 124 of elongated base 120 is splayed out from the plane of mounting plate 110 by approximately 45 degrees and, as such, is in an "easel" configuration.

Figure 5:
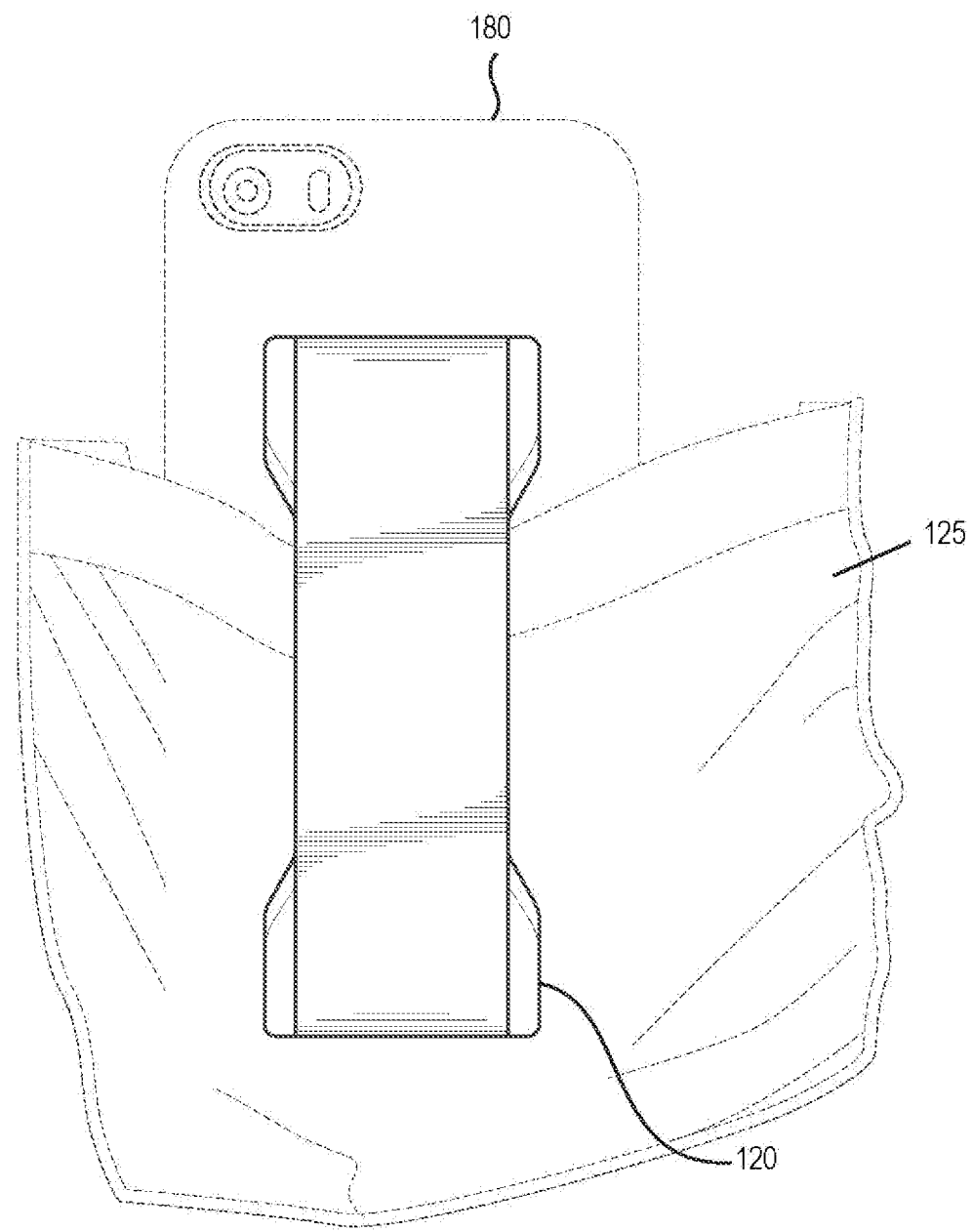
FIG. 5 shows an embodiment of a disclosed article used as a clip to hold a portable electronic display device in a pocket.

FIG. 5 shows an embodiment of a disclosed article used as a clip to hold a portable electronic display device in a pocket. FIG. 5 is a planar view of the back side of electronic device 180 having a disclosed hinged support apparatus disposed thereon. Elongated base 120 of the hinged support apparatus is shown "clipped" over pocket 125, thus securing portable electronic device 180 to the wearer's clothing.

Figure 6:
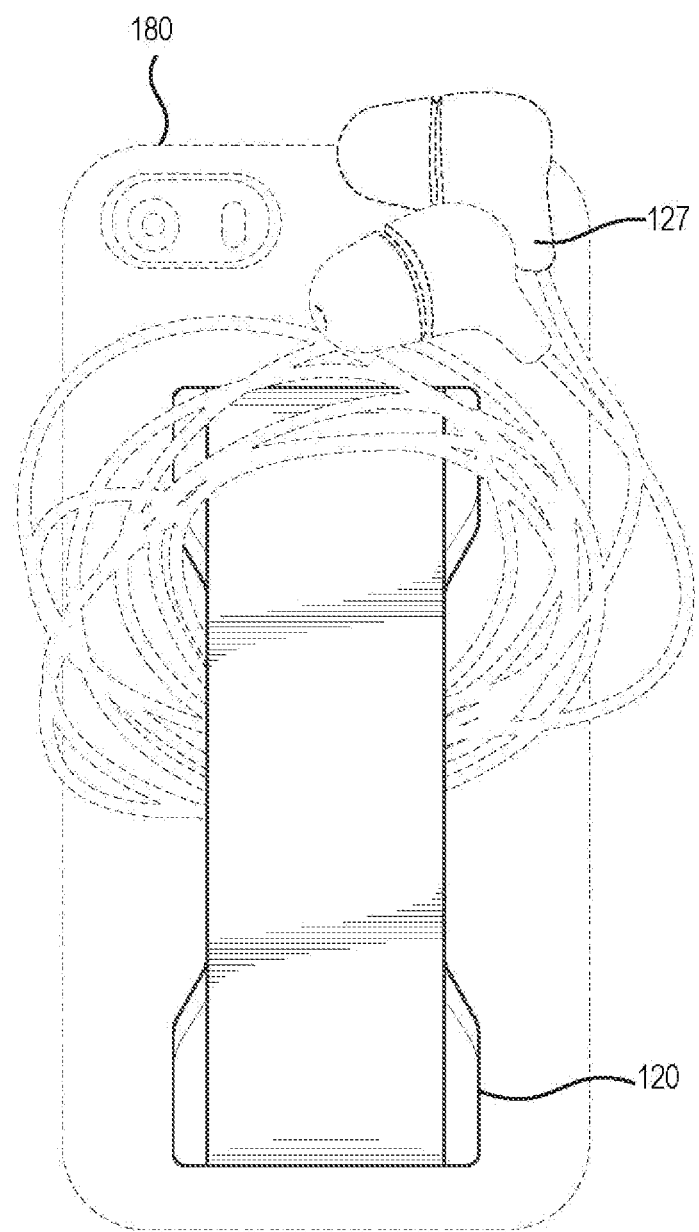
FIG. 6 shows an embodiment of a disclosed article used for storage of earphones.

FIG. 6 shows an embodiment of a disclosed article used for storage of earphones. FIG. 6 is a planar view of the back side of electronic device 180 having a disclosed hinged support apparatus disposed thereon. In this embodiment, earphones 127 are wrapped around elongated base 120 for storage.

Figure 7A:
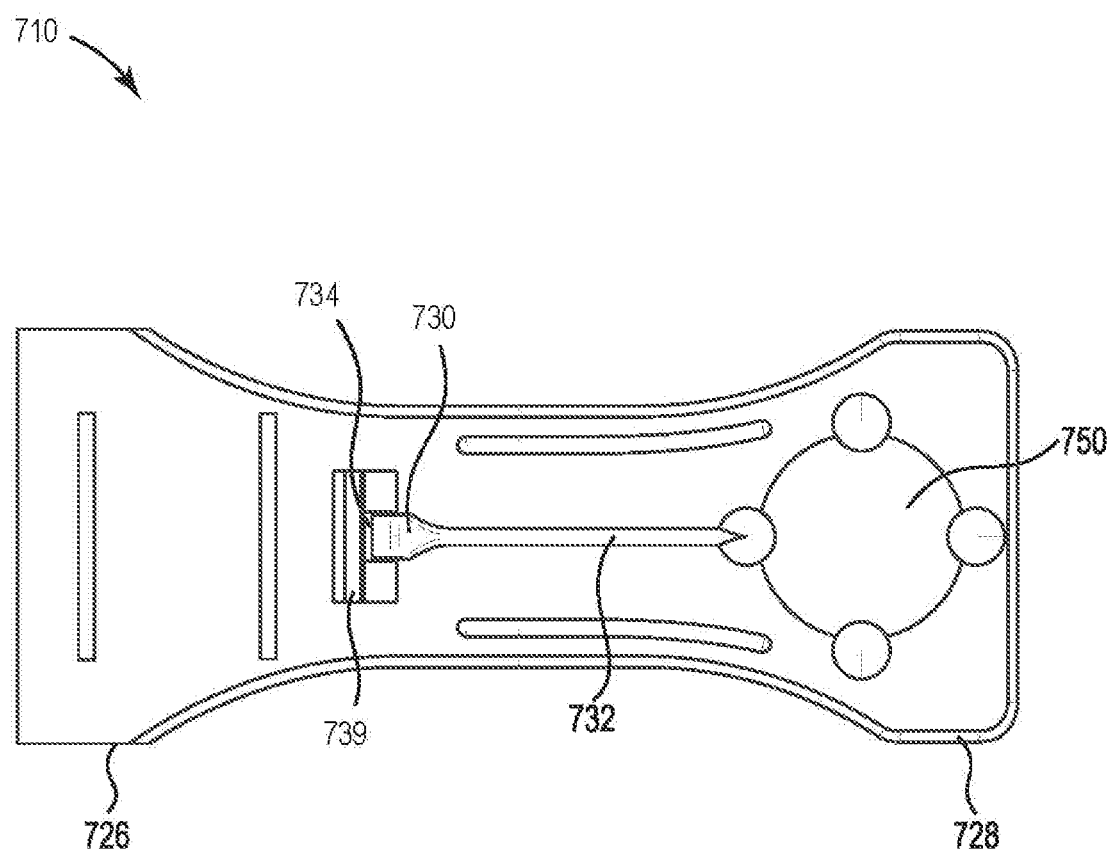
FIG. 7A is a top planar view of an embodiment of the disclosed article the mounting plate of the disclosed article.
Figure 7B:
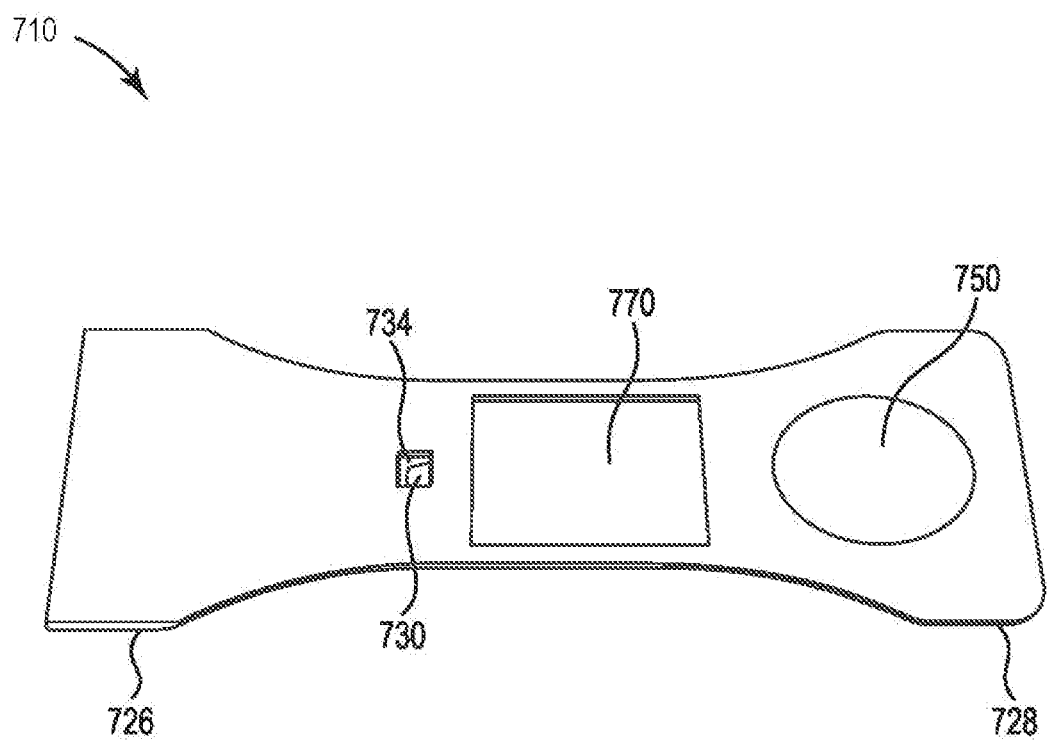
FIG. 7B is a bottom perspective view of the mounting plate illustrated in FIG. 7A showing an RF pocket.
Figure 7C:
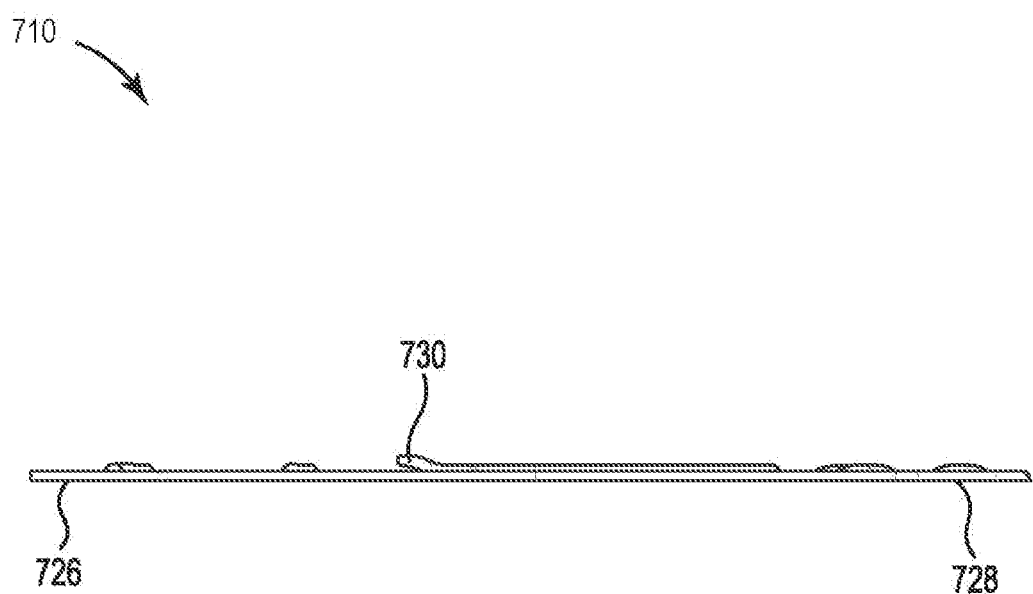
FIG. 7C is a side view of the mounting plate illustrated in FIG. 7A showing a first tenon protruding above the surface of the plate.

FIG. 7A is a top planar view of an embodiment of the mounting plate of the disclosed article. FIG. 7B is a bottom perspective view of the same mounting plate illustrated in FIG. 7A showing an RF pocket. FIG. 7C is a side profile view of the mounting plate illustrated in FIG. 7A showing a tenon protruding above the surface of the mounting plate. FIG. 7A is a top-down view of mounting plate 710. Mounting plate 710 has two ends—proximal end 726 of mounting plate 710 and distal end 728 of mounting plate 710. Mounting plate 710 has mounting plate opening 750 which allows a magnet on the distal end of an attached elongated base to protrude through mounting plate 710. Mounting plate 710 also includes first tenon 730. First tenon 730 is located on the proximal end (not numbered) of first tenon stem 732 and can protrude through be positioned over tenon opening 734. FIG. 7B is a bottom perspective view of the same mounting plate. It shows RF pocket 770 recessed into the bottom of the middle of mounting plate 710 and is there for the optional insertion of an RF tag, if desired. FIG. 7C is a flat profile of mounting plate 710.

Figure 8A:
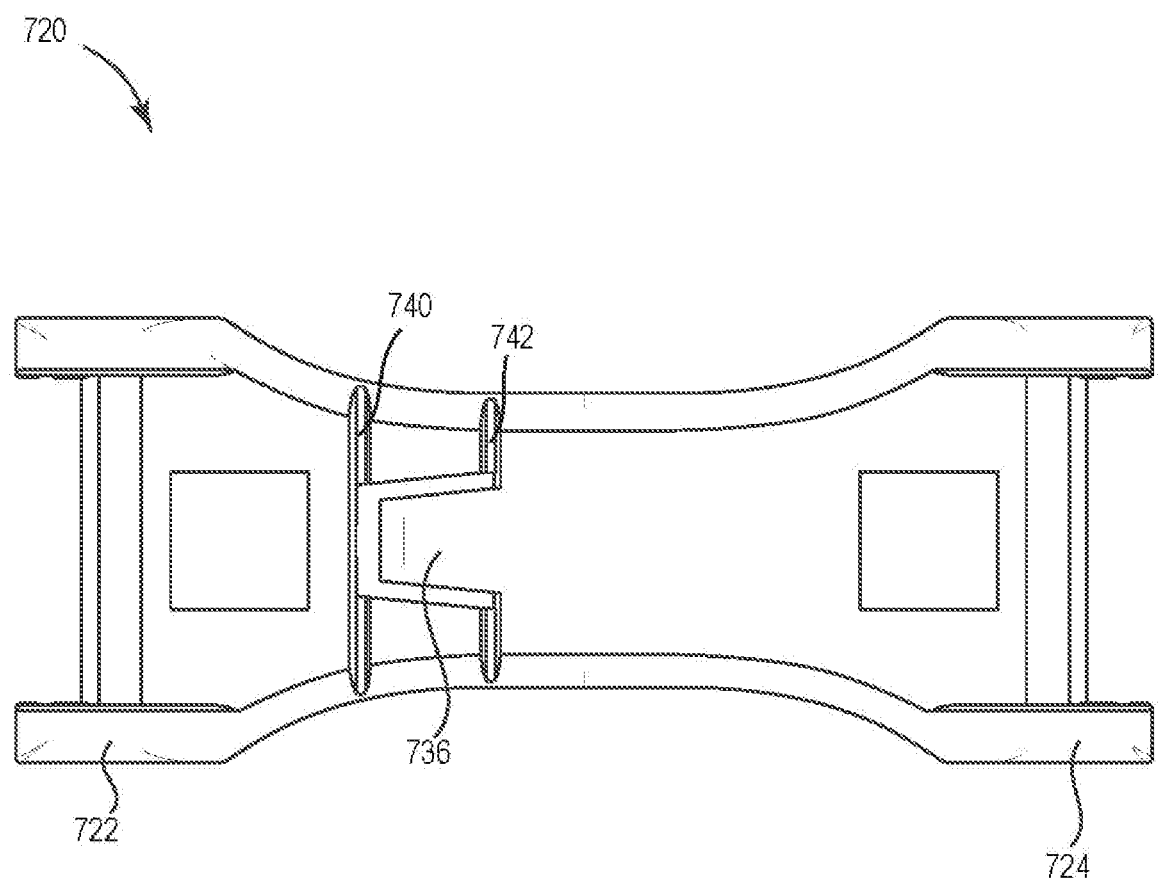
FIG. 8A is a top planar view of the top of the elongated base of the embodiment of the disclosed article shown in FIG. 7B.
Figure 8B:
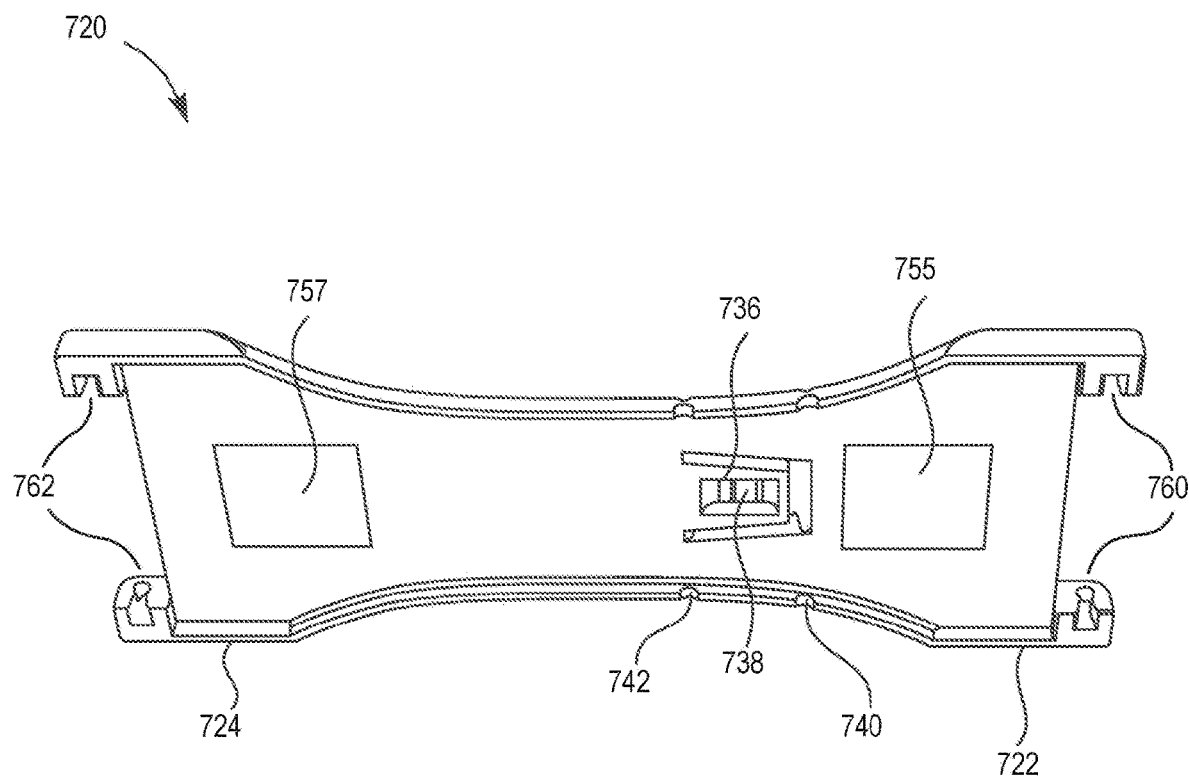
FIG. 8B is a perspective view of the bottom of the elongated base shown in FIG. 8A.

FIG. 8A is a top planar view of the elongated base of the embodiment of the disclosed article shown in FIGS. 7A-C. FIG. 8B is a perspective view of the bottom of the same elongated base shown in FIG. 8A. Elongated base 720 is shown in FIGS. 8A-8B having proximal end 722 and distal end 724. Top planer view (FIG. 8A) shows second tenon 736 near the proximal end 722 of elongated base 720. Bottom perspective view (FIG. 8B) shows proximal spindle recesses 760 and distal spindle recesses 762 used for attachment of an elastic band with a spindle on each end. First living hinge 740 and second living hinge 742 are visible in this view and are towards the proximal end 722 of elongated base 720. First tenon position stop holder 738 is shown disposed upon second tenon 736 which is located on elongated base 720. In the shown embodiment, first tenon position stop holder 738 has two slots into which a first tenon on an attached mounting plate can fit. Finally, elongated base 720 also includes first magnet mortise 755 and second magnet mortise 757.

Figure 9A:
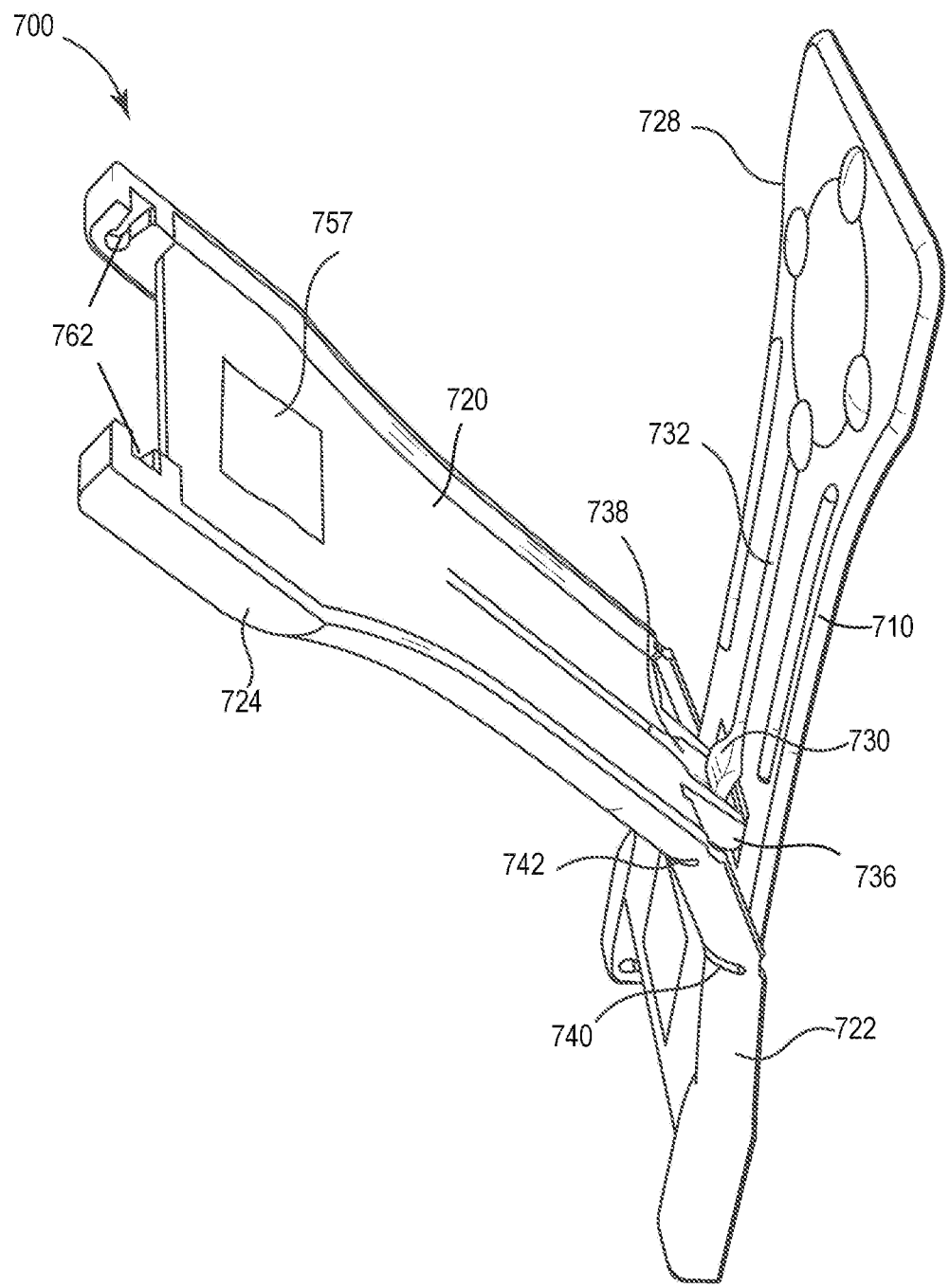
FIG. 9A is a perspective view on embodiment of the hinged connection apparatus showing the kickstand open to a first position.
Figure 9B:
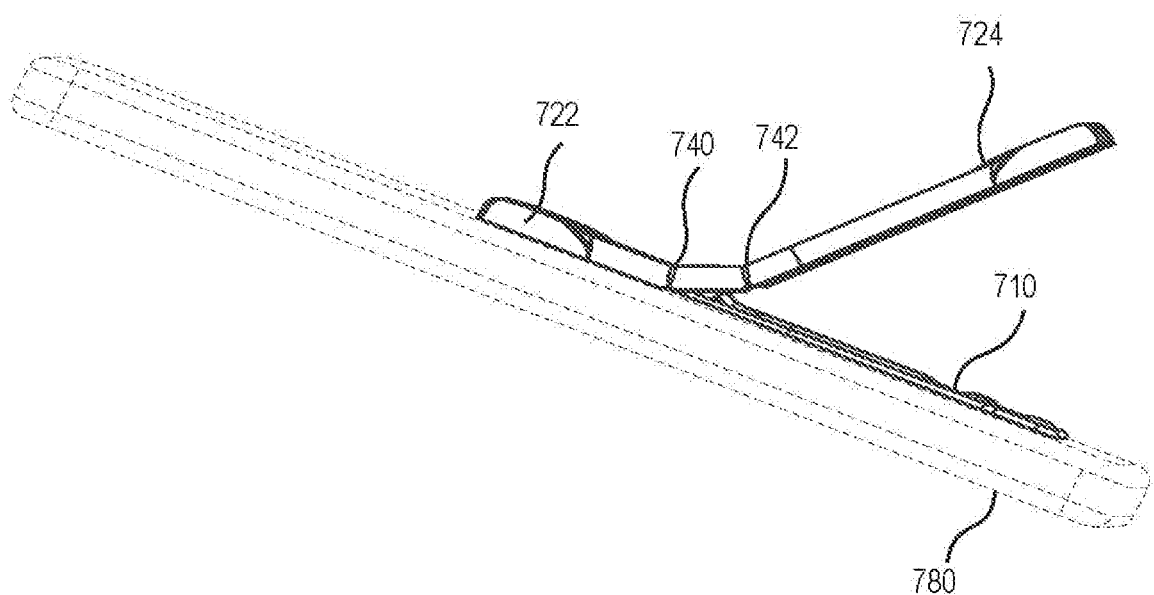
FIG. 9B is a side view the embodiment of shown in FIG. 9A with the kickstand (elongated base) opened to first position.

FIGS. 9A and 9B are a perspective view and a side view of an embodiment of the hinged connection apparatus showing the kickstand (elongated base) open to a first position. FIG. 9A shows hinged support apparatus 700 with the kickstand (elongated base) 720 opened to a first position that is approximately at 45 degrees from mounting plate 710 showing tenons and position stops that hold apparatus 700 in position. Mounting plate 710 is shown (in FIG. 9B) atop of portable electronic device 780. Elongated base 720 is disposed upon mounting plate 710 at its proximal end 722. Proximal end 722 of elongated base 720, which contains first magnet mortise 755, is coplanar with mounting plate 710. Distal end 724 of elongated base 720 is splayed open as shown in FIGS. 9A and 9B and is bent at first living hinge 740 and even more at second living hinge 742. Second magnet mortise 757 is located on distal end 724 of elongated base 720. Mounting plate 710 includes first tenon 730 at the end of first tenon stem 732. As shown in FIG. 9A, first tenon 730 on mounting plate 710 is engaged with a first notch in first tenon position stop holder 738 (same as first mortise) which resides on proximal end 722 of elongated base 720. At the same time, second tenon 736 which resides near proximal end 722 of elongated base 720 is engaged with second tenon position stop holder 739 (same as second mortise) which is part of mounting plate 710. The simultaneous engagement of first tenon 730 (on mounting plate 710) with first mortise 738 (on elongated base 720) and second tenon 736 (on elongated base 720) with second mortise 739 (on mounting plate 710) provide a secure interlock that holds the kickstand (elongated base) at a first position.

Figure 10A:
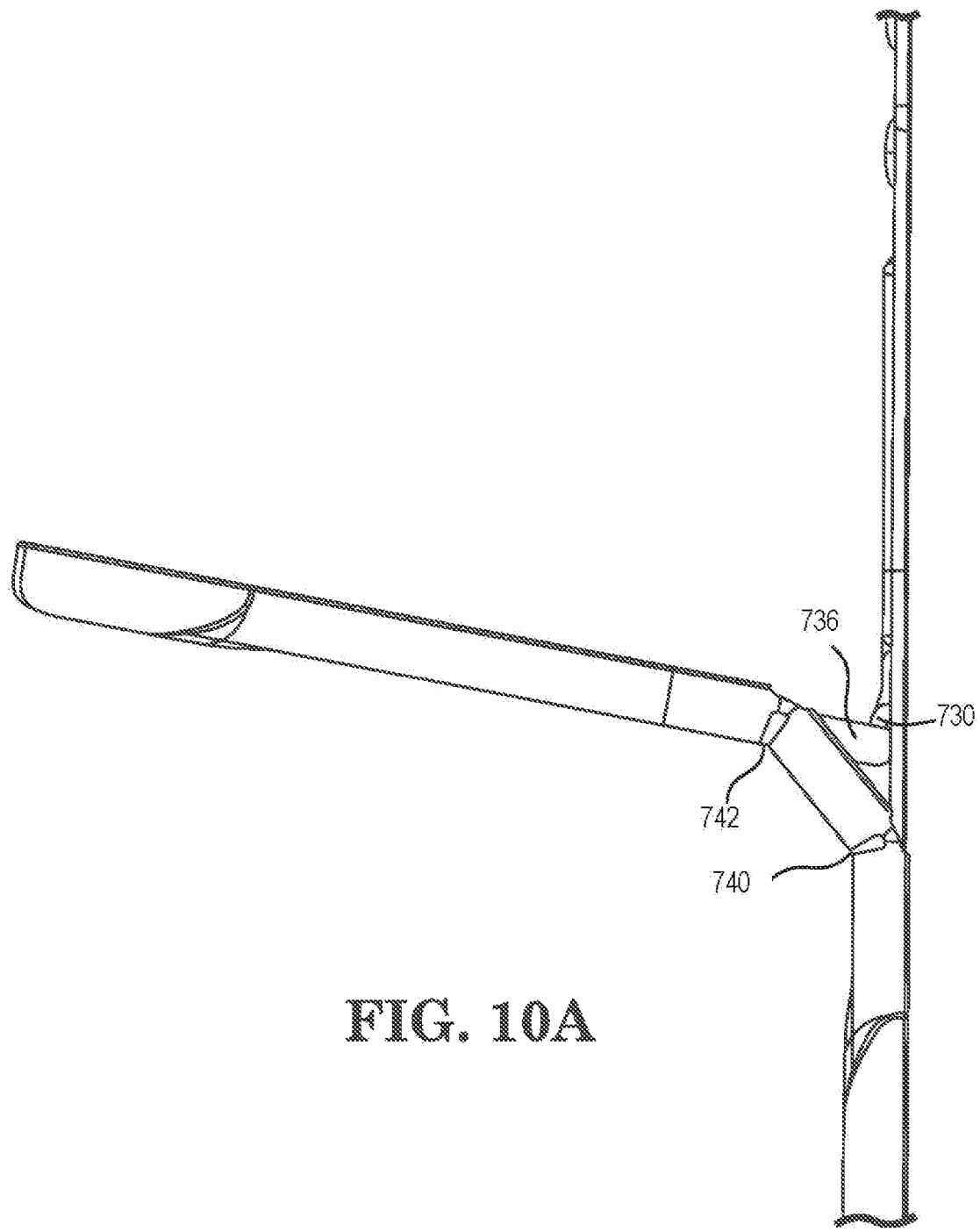
FIG. 10A is a side view of the embodiment illustrated in FIG. 9A in the fully open (ortho or 90 degrees) position with extended tenons interlocked.
Figure 10B:
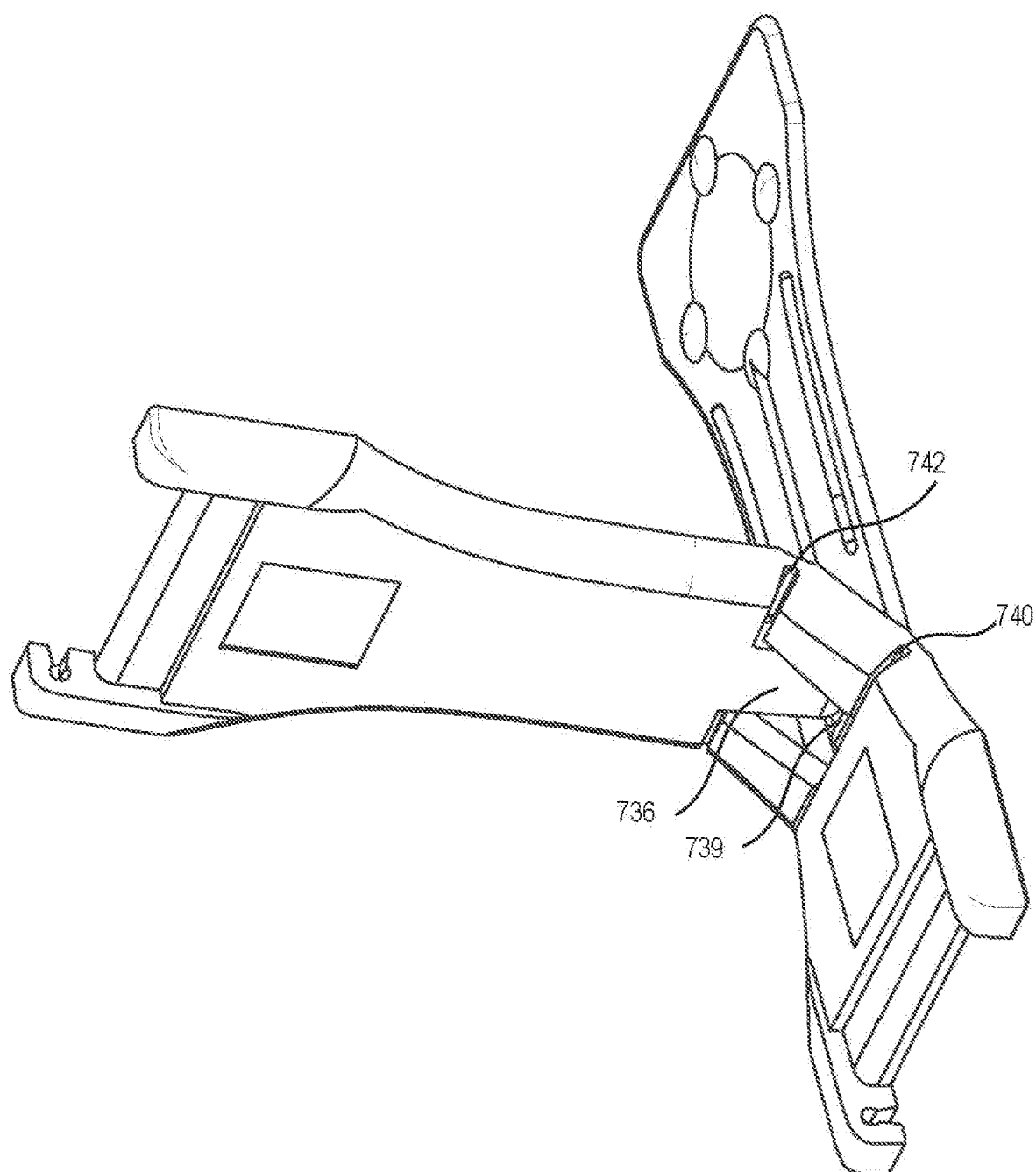
FIG. 10B is a perspective view of the interlocked tenons shown in FIG. 10A.

FIGS. 10A and 10B are a side view and a perspective view respectively of the same embodiment illustrated in FIGS. 9A and 9B in the fully open (ortho or 90 degrees) position with extended tenons interlocked. Since the embodiment shown in FIGS. 10A and 10B are in fully open position, some features are more visible in this set of figures. FIG. 10A shows second tenon 736 projecting downward and first tenon 730 engaged with first tenon position stop (not visible in FIG. 10A). These two engaged tenons hold the position of the illustrated embodiment.

Figure 10C:
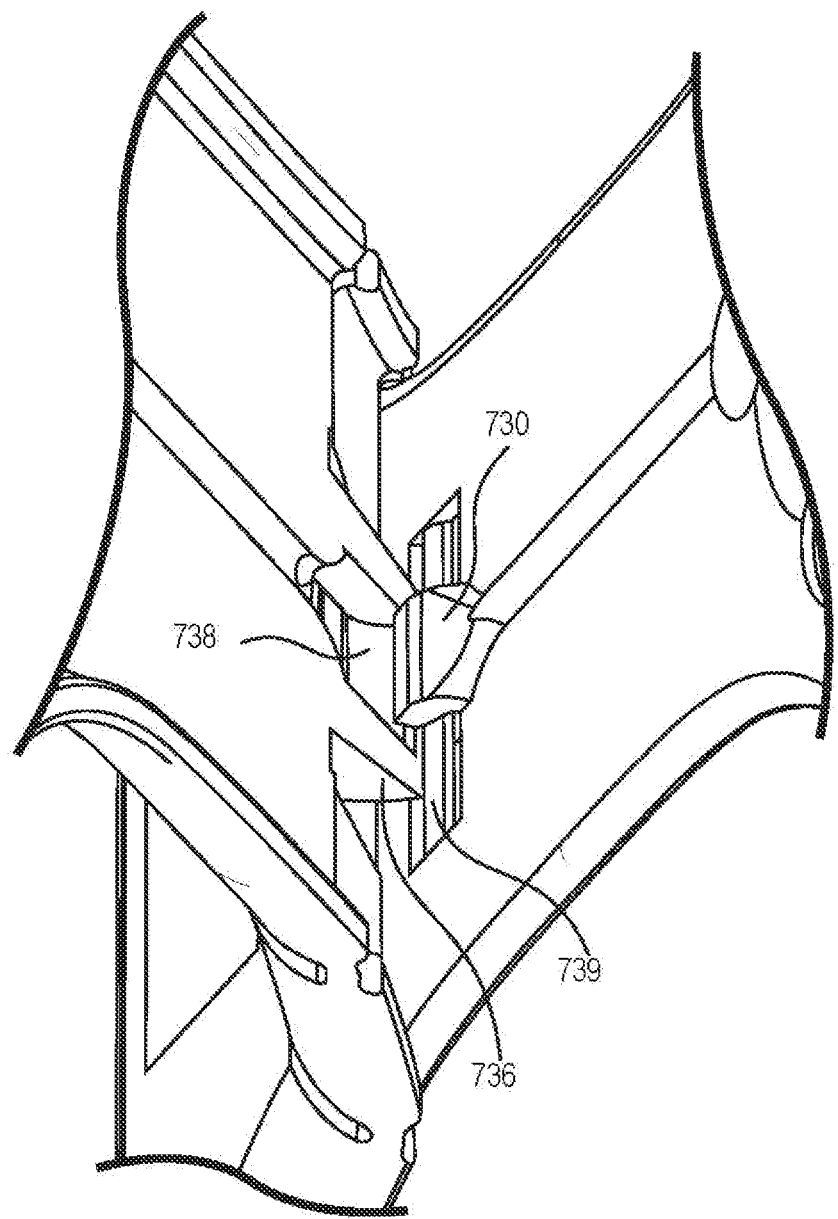
FIG. 10C is a close-up perspective view of interlocked tenons shown in FIGS. 10A and 10B.

In FIG. 10B, second tenon 736 is shown projecting through an opening between first living hinge 740 and second living hinge 742 created when the elongated base 720 is bent at the first living hinge 740. Second tenon 736 is engaged in one of the slots of second position stop 739. FIG. 10C is a close-up perspective view of interlocked tenons shown in FIGS. 10A and 10B. FIG. 10 shows first tenon 730 (on mounting plate) engaged with first tenon position stop holder 738 (on elongated base) and, at the same time, second tenon 736 (on elongated base) engaged with second tenon position stop holder 739 (on mounting plate). First tenon position stop holder 738 and second tenon stop holder 739 can have a plurality of position stops that determine the angle of opening between the elongated base and the mounting plate Various modifications and alterations to this disclosure will become apparent to those skilled in the art without departing from the scope and spirit of this disclosure. It should be understood that this disclosure is not intended to be unduly limited by the illustrative embodiments set forth herein and that such embodiments are presented by way of example only with the scope of the disclosure intended to be limited only by the claims set forth herein as follows. All references cited in this disclosure are herein incorporated by reference in their entirety.

What is claimed is:

1. A hinged support apparatus for a portable electronic display comprising:
   a mounting plate having a proximal end and a distal end;
   an elongated base having a proximal end and a distal end, wherein the proximal end of the elongated base is attached to a portion of the proximal end of the mounting plate;
   a first tenon disposed upon the mounting plate;
   a second tenon disposed upon the elongated base;
   a first mortise disposed upon the elongated base between the proximal end and the distal end of the elongated base, wherein the first mortise is an underside of the second tenon; and
   a second mortise disposed upon the mounting plate, wherein the first tenon is engageable with the first mortise.

2. The hinged support apparatus according to claim 1, wherein the first mortise comprises at least one position stop.

3. The hinged support apparatus according to claim 1, wherein the second mortise comprises at least one position stop.

4. The hinged support apparatus according to claim 1, further comprising an elastic band having a first end and a second end wherein the first end of the elastic band is attached to the proximal end of the elongated base and the second end of the elastic band is attached to the distal end of the elongated base.

5. The hinged support apparatus for a portable electronic display according to claim 1, wherein the mounting plate comprises a strong adhesive.

6. The hinged support apparatus for a portable electronic display according to claim 5, wherein the strong adhesive is attached to the electronic display.

7. The hinged support apparatus for a portable electronic display according to claim 1, wherein the elongated base comprises at least one living hinge.

8. The hinged support apparatus for a portable electronic display according to claim 1, wherein the elongated base comprises two living hinges.

9. The hinged support apparatus for a portable electronic display according to claim 1, wherein the elongated base comprises a magnet.

10. The hinged support apparatus for a portable electronic display according to claim 1, wherein at least a portion of the elongated base is not substantially coplanar to the electronic display and the distal end of the elongated base is positioned away from the mounting plate.

11. The hinged support apparatus for a portable electronic display according to claim 10, wherein the elongated base forms three planes, one of which is substantially coplanar with the mounting plate.

12. A method of using a hinged support apparatus for a portable electronic display comprising:
   providing an apparatus for a portable electronic display device comprising:
      a mounting plate having a proximal end and a distal end;
      an elongated base having a proximal end and a distal end, wherein the proximal end of the elongated base is attached to a portion of the proximal end of the mounting plate;
      a first tenon disposed upon the mounting plate;
      a second tenon disposed upon the elongated base;
      a first mortise disposed upon the elongated base between the proximal end and the distal end of the elongated base, wherein the first mortise is an underside of the second tenon; and
      a second mortise disposed upon the mounting plate;
   bending the elongated base at one living hinge on the elongated base so that the distal end of the elongated base is splayed away from the mounting plate at an angle; and
   locking the distal end of the elongated base in position by engaging the first tenon into position stops built into the first mortise.

13. The method of using a hinged support apparatus for a portable electronic display device according to claim 12, further comprising bending the elongated base at at least one or more living hinges.

14. The method of using a hinged support apparatus for a portable electronic display device according to claim 12, further comprising engaging the second tenon with position stops in the second mortise thereby interlocking the mounting plate and the elongated base.

15. The method of using a hinged support apparatus for a portable electronic display device according to claim 12, further comprising attaching the mounting plate to the portable electronic display device.

16. The method of using a hinged support apparatus for a portable electronic display device according to claim 15, wherein the mounting plate is attached to the portable electronic display device using a strong adhesive.

17. A hinged support apparatus for a portable electronic display comprising:
   a mounting plate having a proximal end and a distal end;
   an elongated base having a proximal end and a distal end, wherein the proximal end of the elongated base is attached to at least a portion of the proximal end of the mounting plate; and
   two living hinges on the elongated base, wherein
      a first of the two living hinges is located between the proximal end and the distal end of the elongated base,
      a second of the two living hinges is located between the first living hinge and the distal end of the elongated base,
      the two living hinges are parallel to each other, and
      the two living hinges pivot in the same direction;
   a first tenon disposed upon the mounting plate,
   a second tenon disposed upon the elongated base,
   a first mortise disposed upon the elongated base between the proximal end and the distal end of the elongated base, and
   a second mortise disposed upon the mounting plate,
   wherein the first mortise is an underside of the second tenon, and
   wherein the first tenon is engageable with the first mortise.

18. The hinged support apparatus of claim 17, further comprising an elastic strap secured to the proximal end and the distal end of the elongated base.

19. The hinged support apparatus of claim 17, wherein the elongated base has a collapsed position where the elongated base substantially overlaps the mounting plate.

\* \* \* \* \*